(12) United States Patent
Knauss

(10) Patent No.: US 11,357,092 B2
(45) Date of Patent: *Jun. 7, 2022

(54) TURN-ON PROCEDURE FOR A LOAD CONTROL SYSTEM

(71) Applicant: Lutron Technology Company LLC, Coopersburg, PA (US)

(72) Inventor: Matthew Knauss, Somerville, MA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/821,912

(22) Filed: Mar. 17, 2020

(65) Prior Publication Data

US 2020/0323070 A1  Oct. 8, 2020

Related U.S. Application Data

(63) Continuation of application No. 16/446,593, filed on Jun. 19, 2019, now Pat. No. 10,609,788, which is a
(Continued)

(51) Int. Cl.
*H05B 47/175* (2020.01)
*H05B 47/115* (2020.01)
(Continued)

(52) U.S. Cl.
CPC ......... *H05B 47/175* (2020.01); *H05B 47/115* (2020.01); *H05B 47/13* (2020.01); *H05B 47/19* (2020.01)

(58) Field of Classification Search
CPC .... H05B 47/175; H05B 47/105; H05B 47/19; H05B 47/115; H05B 47/13
See application file for complete search history.

(56) References Cited

U.S. PATENT DOCUMENTS 6,151,529 A   11/2000   Batko et al.
6,759,954 B1   7/2004   Myron et al.
(Continued)

FOREIGN PATENT DOCUMENTS

JP   10134966 A   5/1998

*Primary Examiner* — Minh D A
(74) *Attorney, Agent, or Firm* — Michael Czarnecki; Philip Smith; Glen Farbanish

(57) ABSTRACT

A load regulation device is adapted to control an electrical load. The load regulation device may be in a low power state, a ready state, and/or an on state. The low power state is characterized by the electrical load being unenergized. The ready state is characterized by a load control device and/or the load regulation device using more power than the low power state and the electrical load being unenergized. The on state is characterized by the electrical load being energized. The load regulation device is configured to receive an indication of a user's presence when the load regulation device is in the low power state. The load regulation device is configured to change from the low power state to the ready state in response to receiving the indication. The load regulation device is configured to wait in the ready state for a change state instruction.

20 Claims, 11 Drawing Sheets

Related U.S. Application Data continuation of application No. 16/119,251, filed on Aug. 31, 2018, now Pat. No. 10,342,099, which is a continuation of application No. 15/667,035, filed on Aug. 2, 2017, now Pat. No. 10,104,748, which is a continuation of application No. 14/227,677, filed on Mar. 27, 2014, now Pat. No. 9,743,496.

(60) Provisional application No. 61/904,008, filed on Nov. 14, 2013.

(51) Int. Cl.
    *H05B 47/19* (2020.01)
    *H05B 47/13* (2020.01)

(56) References Cited

U.S. PATENT DOCUMENTS

| | | |
|---|---|---|
| 7,786,623 B2 | 8/2010 | Carpenter et al. |
| 7,940,167 B2 | 5/2011 | Steiner et al. |
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,665,090 B2 | 3/2014 | Bull et al. |
| 8,698,727 B2 | 4/2014 | Herz et al. |
| 8,698,792 B2 | 4/2014 | Chang et al. |
| 8,823,268 B2 | 9/2014 | Saveri, III et al. |
| 8,842,008 B2 | 9/2014 | Bull et al. |
| 9,006,977 B2 | 4/2015 | Ziegler et al. |
| 9,035,769 B2 | 5/2015 | Steiner et al. |
| 9,392,675 B2 | 7/2016 | Bhat et al. |
| 9,743,496 B2 * | 8/2017 | Knauss ................ H05B 47/105 |
| 10,104,748 B2 * | 10/2018 | Knauss ................ H05B 47/115 |
| 10,342,099 B2 * | 7/2019 | Knauss ................ H05B 47/105 |
| 10,609,788 B2 * | 3/2020 | Knauss ................ H05B 47/105 |
| 2008/0042588 A1 | 2/2008 | Chan et al. |
| 2011/0095698 A1 | 4/2011 | Sasakawa et al. |
| 2011/0133655 A1 | 6/2011 | Recker et al. |
| 2012/0056726 A1 | 3/2012 | Paul et al. |
| 2012/0181934 A1 * | 7/2012 | Knibbe ................ H05B 47/175 315/130 |
| 2012/0226453 A1 | 9/2012 | Williams et al. |
| 2012/0313535 A1 | 12/2012 | Bedell et al. |
| 2012/0330476 A1 | 12/2012 | Huizenga et al. |
| 2013/0093347 A1 * | 4/2013 | Tran .................... H05B 41/046 315/224 |
| 2013/0119892 A1 | 5/2013 | Feri et al. |
| 2015/0015377 A1 | 1/2015 | Bull et al. |

* cited by examiner

TURN-ON PROCEDURE FOR A LOAD CONTROL SYSTEM

CROSS REFERENCE TO RELATED APPLICATIONS

This application is a continuation of U.S. patent application Ser. No. 16/446,593, filed Jun. 19, 2019, now U.S. Pat. No. 10,609,788, issued on Mar. 31, 2020, is a continuation of U.S. patent application Ser. No. 16/119,251, filed Aug. 31, 2018, now U.S. Pat. No. 10,342,099, issued on Jul. 2, 2019, which is a continuation of U.S. patent application Ser. No. 15/667,035, filed Aug. 2, 2017, now U.S. Pat. No. 10,104, 748, issued on Oct. 16, 2018, which is a continuation of U.S. patent application Ser. No. 14/227,677, filed Mar. 27, 2014, now U.S. Pat. No. 9,743,496, issued on Aug. 22, 2017, which claims the benefit of U.S. Provisional Patent Application No. 61/904,008, filed Nov. 14, 2013, the contents of which are hereby incorporated by reference in their entirety.

BACKGROUND

A load control system may include one or more sensors, load control devices, load regulation devices, and/or electrical loads. A load control device may be adapted to control an electrical load. For example, a load control device may control an electrical load by controlling the amount of power delivered from a power source (e.g., an alternating current (AC) power source) to the electrical load (e.g., via a load regulation device of the electrical load). An example of a load control device may be a light switch. A load regulation device may be configured to receive a signal from a load control device and control an electrical load in response to the received signal. For example, a load regulation device may receive a form of mains line voltage from a mains power source (e.g., via a load control device) and convert the mains line voltage to an appropriate voltage waveform to drive the electrical load. An example of an electrical load may be a lighting load, such as an incandescent lamp, a halogen lamp, a gas discharge lamp (e.g., a fluorescent lamp), a phosphor-based lamp, a high-intensity discharge (HID) lamp, a light-emitting diode (LED) light source, and the like. An example of a load regulation device may be a ballast for a fluorescent lamp or an LED driver for an LED light source. An example of a sensor may be an occupancy sensor, a vacancy sensor, a daylight sensor, a temperature sensor, and the like.

Referring to FIG. 1, an example state diagram of a prior art turn-on procedure 100 for a load regulation device is illustrated. The load regulation device may be part of a load control system. The turn-on procedure 100 may include two states, a low power state 101 and an on state 102, and may be characterized by a transition 103 from the low power state 101 to the on state 102. The low power state 101 may be characterized by the electrical load being unenergized. An example of a low power state 101 may be an off state. In the off state, no power is consumed by the load control device and/or the load regulation device, and the electrical load is unenergized. Another example of a low power state 101 may be an electronic off state. In the electronic off state, a relatively small amount of power is consumed by the load control device and/or the load regulation device, and the electrical load is unenergized. The on state 102 may be characterized by the electrical load being energized.

The load regulation device may change from the low power state 101 to the on state 102 in response to an input. The input may be an analog input and/or a digital input. For example, the input may be the actuation of an actuator (e.g., a switch) of a load control device of the load control system, a signal received from a sensor of the load control system, and/or the like. The transition 103 from the low power state 101 to the on state 102 may be characterized by one or more of the following: rendering conductive a controllably conductive device of a load control device, energizing a processor of the load regulation device, charging a power supply of the load regulation device, initializing a communication channel (e.g., a communication link) between a load control device and the load regulation device, preheating one or more filaments of an electrical load, and energizing an electrical load.

Referring to FIG. 2, an example of a prior art turn-on procedure 200 for a load regulation device is illustrated. The load regulation device may be part of a load control system. For example, in the load control system of FIG. 2, a load control device (e.g., a light switch) may be coupled in series electrical connection between an AC power source and the load regulation device (e.g., a ballast) for an electrical load (e.g., a fluorescent lamp). The state diagram of FIG. 2 illustrates an example depiction of the states of the prior art turn-on procedure 200. At 201, the vicinity around the electrical load may be vacant, the load regulation device may be in a low power state, and the electrical load may be unenergized. The low power state of the turn-on procedure 200 may be an off state, where no power is consumed by the load control device and/or the load regulation device and the electrical load is unenergized. Alternatively, the low power state may be an electronic off state, where a relatively small amount of power is consumed by the load control device and/or load regulation device and the electrical load is unenergized.

At 202, a user may enter the vicinity around the electrical load (e.g., the room in which the electrical load is located). When the user enters the vicinity around the electrical load, the load regulation device may stay in the off state and the electrical load may remain unenergized. At 203, the user may actuate an actuator of the load control device. When the user actuates the actuator of the load control device, the load control device may connect the load regulation device to the AC power source (e.g., by closing a switch of the load control device), such that the load regulation device may change from the off state to the on state, for example, as described with reference to FIG. 1. Alternatively, if the low power state is an electronic off state, the load control device may transmit a control signal to the load regulation device to cause the load regulation device to change from the off state to the on state. The on state may be characterized by the electrical load being energized.

In the turn-on procedure 200, the load regulation device may change from the off state to the on state upon actuation of the actuator of the load control device. However, the turn-on time of the electrical load may be noticeable to the user. The turn-on time may be the time it takes from the user's actuation of the actuator (e.g., at 203) to the electrical load becoming energized (e.g., at 204). The noticeable turn-on time may be due to the steps and/or functions that may be performed during the transition from the off state to the on state upon the actuation of the actuator. For example, since the load regulation device is in the off state when the user actuates the actuator at 203, and since the off state is characterized by no power being consumed by the load control device and/or the load regulation device, the transition from the off state to the on state may take a noticeable amount of time (e.g., approximately 1 second or more). Not only can the noticeable turn-on time aggravate the user, but the noticeable turn-on time may cause user operation errors, such as subsequent actuations of the actuator by the user before the load regulation device reaches the on state. These errors may further frustrate the user and degrade the user's experience.

SUMMARY

A load regulation device may be part of a load control system. The load regulation device may be adapted to control an electrical load. For example, the load regulation device may be a ballast and the electrical load may be a lighting load (such as, for example, a fluorescent lamp). The load regulation device may be in a low power state, a ready state, and/or an on state. The low power state may be characterized by the electrical load being unenergized. The ready state may be characterized by the load regulation device and/or a load control device of the load control system using more power than the low power state, and the electrical load being unenergized. The on state may be characterized by the electrical load being energized.

The load regulation device may receive an indication of a user's presence (e.g., a signal), for example, when the load regulation device is in the low power state. The load regulation device may transition from the low power state to the ready state in response to receiving the indication. The indication may be received from a sensor (e.g., an occupancy sensor). The sensor may be a standalone device, part of the load control device, or part of the load regulation device. The transition from the low power state to the ready state may be characterized by one or more of: rendering conductive a controllably conductive device of a load control device, energizing a processor of the load regulation device, charging a power supply of the load regulation device, initializing a communication channel between the load control device and the load regulation device, preheating one or more filaments of the electrical load, and the like.

The load regulation device may wait in the ready state for a change state instruction. Therefore, although the load regulation device may receive the indication of the user's presence, the load regulation device may not transition from the low power state to the on state and the electrical load may not be energized. Rather, the load regulation device may transition to and stay in the ready state, and may wait for further instruction.

When in the ready state, the load regulation device may determine whether the change state instruction is received. The load regulation device may receive the change state instruction from a load control device, a sensor, an actuator, and/or another component of the load control system. For example, the change state instruction may be received in response to actuation of an actuator of a load control device, or may be received from a sensor detecting a user's presence, or the like. An example of an actuator of a load control device may be a switch, such as a toggle switch, a button, a slider switch, and the like.

If the change state instruction is not received within a predetermined period of time, the load regulation device may transition from the ready state back to the low power state. This may be performed to conserve power, for example, if the user does not desire to have the electrical load energized. If the change state instruction is received, the load regulation device may transition from the ready state to the on state. The on state may be characterized by the electrical load being energized. As such, the transition from the ready state to the on state may be characterized by the load regulation device energizing the electrical load.

A load control system may include a sensor and a load regulation device. The sensor may detect a user's presence, and send an indication of the user's presence. The indication may be sent to the load regulation device either directly or indirectly (e.g., via a load control device of the load control system). The load regulation device may receive the indication of the user's presence. The load regulation device may transition from a low power state to a ready state in response to receiving the indication. The load regulation device may wait in the ready state for a change state instruction.

DETAILED DESCRIPTION

Figure 1:
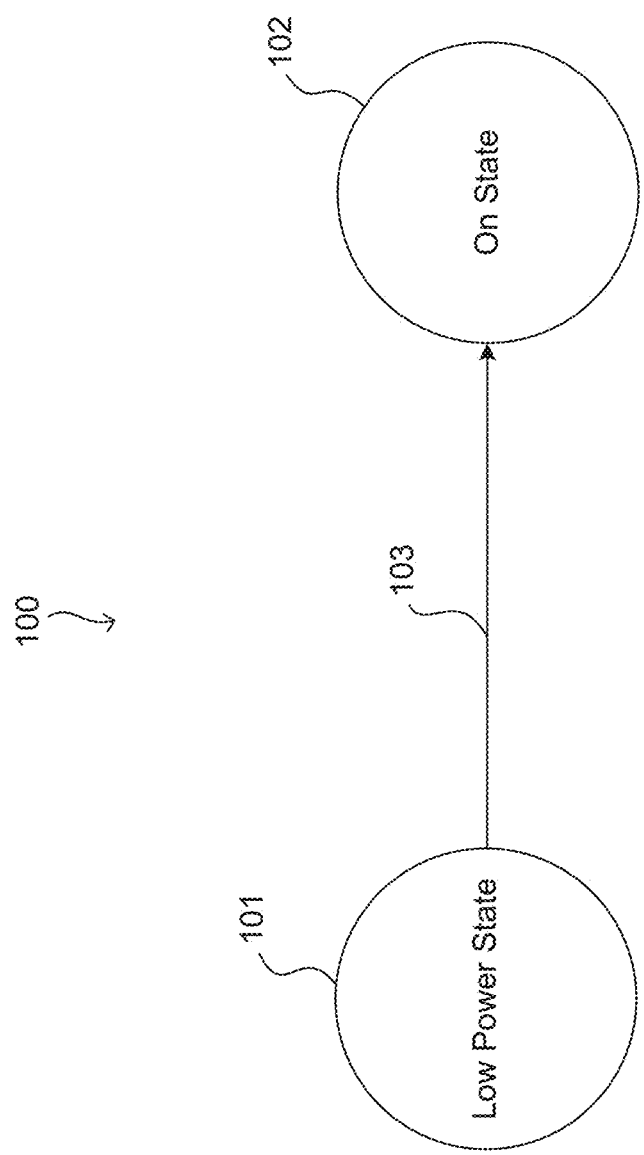
FIG. 1 is a state diagram of an example prior art turn-on procedure for a load regulation device.
Figure 2:
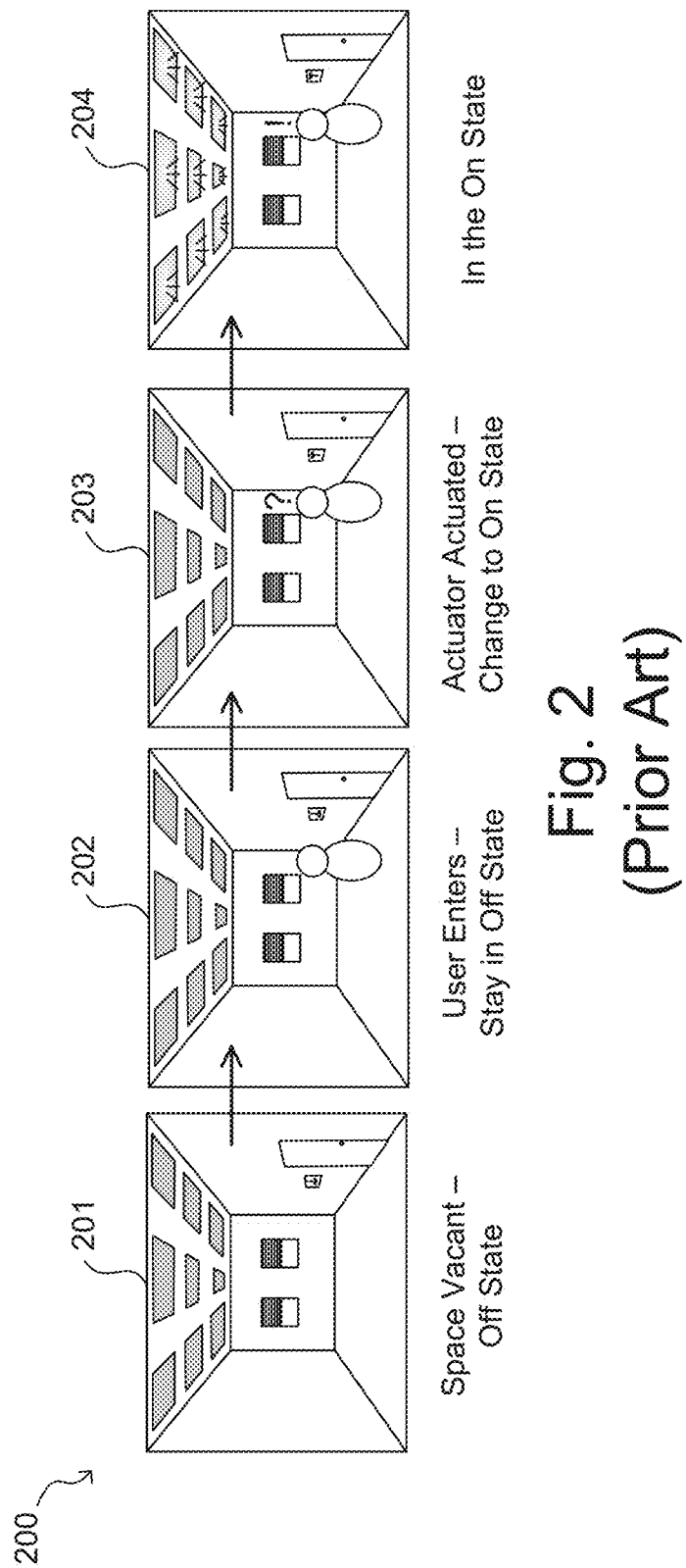
FIG. 2 is a state diagram of an example of a prior art turn-on procedure for a load regulation device.
Figure 3:
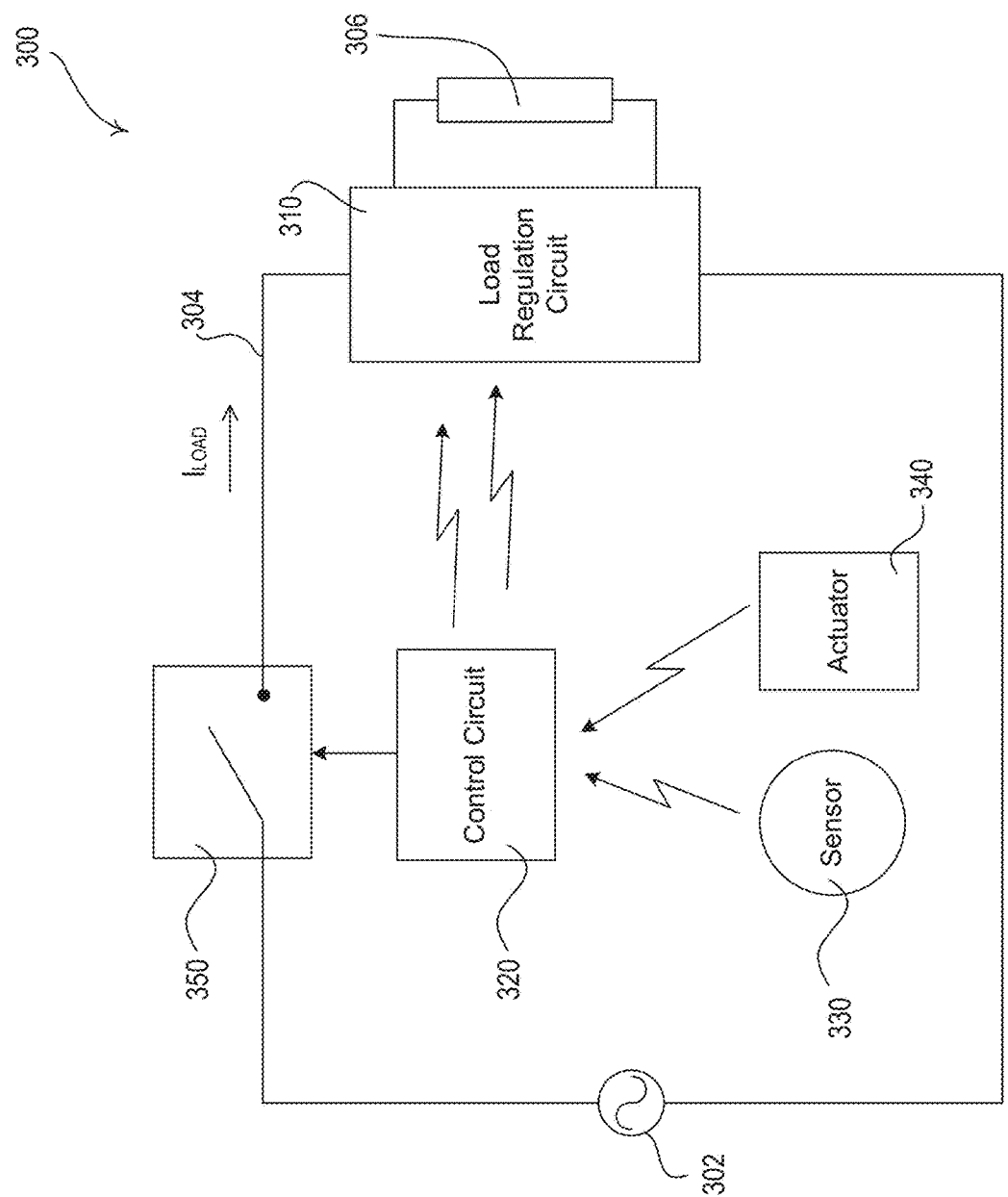
FIG. 3 is a block diagram of an example load control system for performing a turn-on procedure.

FIG. 3 is a block diagram illustrating an example load control system 300. The load control system 300 may include an alternating current (AC) power source 302, an electrical load 306, a load regulation circuit 310, a control circuit 320, a sensor 330, an actuator 340, and a switching circuit 350. The load regulation circuit 310 may perform a turn-on procedure as described herein. The load regulation circuit 310 may receive a signal, for example, via the control circuit 320 and/or the switching circuit 350. The load regulation circuit 310 may receive a form of mains line voltage from the AC power source 302 and may control (i.e., drive) the electrical load 306 in response to the signal received from the control circuit 320 and/or the switching circuit 350. For example, the load regulation circuit 310 may convert the mains line voltage to an appropriate voltage waveform to control the electrical load 306. The load regulation circuit 310 may be an LED driver for controlling (i.e., driving) the electrical load 306, which may comprise an LED light source. Alternatively, the load regulation circuit 310 may be an electrical ballast for controlling (i.e., driving) a fluorescent lamp. In some embodiments, the load regulation circuit 310 may include an internal controller (e.g., a processor, such as a microprocessor), a receiver, a transmitter, and/or a memory.

The load regulation circuit 310 may operate in a low power state, a ready state, and/or an on state. The low power state may be characterized by the electrical load 306 being unenergized. For example, if the electrical load 306 is a lighting load, then when the load regulation circuit 310 is in the low power state, the lighting load does not emit light. An example of a low power state may be an off state. The off state may be characterized by power not being used by the control circuit 320 and/or the load regulation circuit 310, and the electrical load 306 being unenergized. Another example of a low power state is an electronic off state. The electronic off state may be characterized by a relatively small amount of power being used by the control circuit 320 and/or the load regulation circuit 310, and the electrical load 306 being unenergized. The on state may be characterized by the electrical load 306 being energized. If the electrical load 306 is a lighting load, then when the load regulation circuit 310 is in the on state, the lighting load emits light. For example, if the electrical load 306 is a gas discharge lamp, then the gas discharge lamp may be energized when a load current is established through the gas discharge lamp (i.e., an arc current is conducted from one filament of the gas discharge lamp to the other filament).

The ready state may be characterized by greater power usage than the low power state and the electrical load 306 being unenergized. For example, the ready state may be characterized by greater power usage than the off state and/or the electronic off state, and the electrical load 306 being unenergized. The transition from the low power state to the ready state may be characterized by one or more of the following: performing a start-up routine, preheating one or more filaments of the electrical load 306, and/or initializing a communication channel between the load regulation circuit 310 and the control circuit 320. The start-up routine may be characterized by one or more of: rendering a controllably conductive device (e.g., of the control circuit 320) conductive, energizing a microprocessor of the load regulation circuit 310, charging a power supply (e.g., comprising one or more capacitors) of the load regulation circuit 310, and/or the like. The transition from the low power state to the ready state may be characterized by the load regulation circuit 310 preheating one or more filaments of the electrical load 306, for example, if the electrical load 306 is a gas discharge lamp having filaments. The transition from the low power state to the ready state may be characterized by an establishment of a communication channel, for example, between the load regulation circuit 310 and the control circuit 320. The establishment of the communication channel may be via radio-frequency (RF), infrared (IR), power line carrier (PLC), sound waves, a low voltage wired datalink (e.g., EcoSystem®, QS protocol, etc.), and/or the like.

If the transition from the low power state to the ready state is characterized by preheating one or more filaments of the electrical load 306, then the load regulation circuit 310 may deliver current to the one or more filaments of the electrical load 306 in order to preheat the filaments. As such, trace amounts of residual current may pass through the electrical load 306, which may cause the electrical load 306 to emit a very small amount of light that may or may not be perceivable to a user. Nonetheless, the electrical load 306 is still considered to be unenergized. For example, if the electrical load 306 is a gas discharge lamp and the load regulation circuit 310 is preheating the filaments (i.e., electrodes) of the gas discharge lamp, current may pass through the filaments, which may cause the filaments to glow. However, the current may be conducted from a filament to ground, as opposed to through the gas discharge lamp from one filament to another filament. Therefore, although current may be passing through the filaments, an arc is not created through the gas of the gas discharge lamp (i.e., an established arc current is not generated through the gas of the gas discharge lamp). As such, the gas discharge lamp is considered to be unenergized.

The load regulation circuit 310 may receive an input that may trigger the load regulation circuit 310 to change state. The input may be a signal, for example, a digital message. The signal may be an analog signal and/or a digital signal. The load regulation circuit 310 may receive the signal from the control circuit 320, the sensor 330, the actuator 340, and/or the switching circuit 350. The signal may be an indication of a user's presence. The signal may be a change state instruction. For example, the signal may be received via RF, IR, PLC, sound waves, a low voltage wired datalink (e.g., EcoSystem®, QS protocol, etc.), and/or the like. The signal may be a change in current ΔI of a signal received from the AC power source 302 (e.g., via the control circuit 320). The signal may be a change in voltage ΔV of the signal received from the AC power source 302 (e.g., via the control circuit 320).

The load regulation circuit 310 may receive a signal from the sensor 330 (e.g., either directly from the sensor 330 and/or indirectly via the control circuit 320). The signal received from the sensor 330 may indicate either the presence of a user, or the lack of a presence of a user. For example, the load regulation circuit 310 may receive the signal indicating the user's presence (or lack thereof) within the vicinity of the electrical load 306. The load regulation circuit 310 may change state (e.g., from the low power state to the ready state, from the ready state to the on state, and/or vice versa) in response to receiving the indication of the user's presence (or lack thereof).

The load regulation circuit 310 may receive signals from more than one sensor 330 (e.g., as described with reference to FIGS. 7-8). The sensors may be part of different groups (e.g., occupancy groups). For example, the load regulation circuit 310 may receive a first signal from a first sensor located in a first location, such as a hallway. The load regulation circuit 310 may change state in response to receiving the first signal from the first sensor. For example, the load regulation circuit 310 may change from the low power state to the ready state in response to receiving the first signal from the first sensor. The load regulation circuit 310 may receive a second signal from a second sensor located in a second location, such as a room with the electrical load 306, for example. The electrical load 306 may be in closer proximity to the second sensor than the first sensor. The load regulation circuit 310 may change state in response to receiving the second signal from the second sensor. For example, the load regulation circuit 310 may change from the ready state to the on state in response to receiving the second signal from the second sensor.

The load regulation circuit 310 may receive the signal from the actuator 340 (e.g., either directly from the actuator 340 and/or indirectly via the control circuit 320). The signal may be received in response to actuation of the actuator 340. For example, the load regulation circuit 310 may receive the signal from the actuator 340 in response to actuation of the actuator 340, and may change state (e.g., from the ready state to the on state) in response to receiving the signal.

The load regulation circuit 310 may receive the signal from the switching circuit 350 (e.g., either directly from the switching circuit 350 and/or indirectly via the control circuit 320). The signal may be a change in current of the signal received from the AC power source 302 (e.g., via the control circuit 320). For example, the load regulation circuit 310 may receive the signal from the switching circuit 350, detect a change in current, and change state (e.g., from the ready state to the on state) in response to detecting the change in current.

The switching circuit 350 may be configured to allow and/or prevent the flow of current from the AC power source 302 to the load regulation circuit 310 via circuit wiring 304. The switching circuit 350 may comprise a controllably conductive device, such as a relay or a bidirectional semiconductor switch, such as, for example, a thyristor, a triac, one or more silicon-controlled rectifiers (SCRs), a field-effect transistor (FET) in a full-wave rectifier bridge, two FETs coupled in anti-series connection, and/or one or more insulated-gate bipolar junction transistors (IGBTs).

The switching circuit 350 may be in one of a plurality of states, such as an open state and/or a closed state, for example. The control circuit 320 may control the state of the switching circuit 350. When the switching circuit 350 is in the closed state, power may be delivered from the AC power source 302 to the load regulation circuit 310 and the electrical load 306. For example, when the switching circuit 350 is in the closed state, the control circuit 320 may control and/or alter the mains line voltage delivered from the AC power source 302 to the electrical load 306. When the switching circuit 350 is in the open state, current may be prevented from being conducted from the AC power source 302 to the load regulation circuit 310 and the electrical load 306.

The switching circuit 350 may be a standalone device. The switching circuit 350 may be part of (i.e., integrated with) the control circuit 320 and/or the load regulation circuit 310. For example, the switching circuit 350 may be part of (i.e., integrated with) the control circuit 320 in a single device (i.e., similar to a wall-mounted dimmer switch). The load control system 300 may not include the switching circuit 350.

Although not shown, the control circuit 320 may include a controller (e.g., a processor, such as a microprocessor), a receiver, a transmitter, and/or a memory. The control circuit 320 may control the amount of power delivered to the electrical load 306 (e.g., via the load regulation circuit 310). The control circuit 320 may control the amount of power delivered to the electrical load 306 by modifying the signal provided to the electrical load 306 from the AC power source 302 using the switching circuit 350 and/or by transmitting a signal (e.g., a digital message) to the load regulation circuit 310. The control circuit 320 may control the load regulation circuit 310 to change state via one or more of the signals described herein.

The control circuit 320 may receive a signal (e.g., a digital message) from a component of the load control system 300, such as the sensor 330 and/or the actuator 340. The control circuit 320 may control a component of the load control system 300 (e.g., the load regulation circuit 310 and/or the switching circuit 350) in response to receiving the signal. For example, in response to receiving the signal, the control circuit 320 may send a signal (e.g., which may be the same as the received signal or may be a different signal) to a component of the load control system 300 to control the component of the load control system 300. For example, the control circuit 320 may receive a signal indicating a user's presence from the sensor 330, and send a signal to the load regulation circuit 310 triggering it to change state. The signal may be sent and/or received via RF, IR, PLC, sound waves, a low voltage wired datalink (e.g., Ecosystem®, QS protocol, etc.), and/or the like. The sent and/or received signal may be a change in current (i.e., $\Delta I$). The sent and/or received signal may be a change in voltage (i.e., $\Delta V$). The signal sent by the control circuit 320 may be the same as the signal received by the control circuit 320. For example, the control circuit 320 may route the signal it receives to another component of the load control system 300. The signal sent by the control circuit 320 may be different from the signal received by the control circuit 320.

The control circuit 320 may control the state of the load regulation circuit 310 in accordance with the received signal. The control circuit 320 may receive the signal from the sensor 330. The signal received from the sensor 330 may be a signal indicating the presence of a user (or lack thereof) in the vicinity around the electrical load 306. The control circuit 320 may receive the signal from the sensor 330 and instruct the load regulation circuit 310 to change state (e.g., from the low power state to the ready state, from the ready state to the on state, from the on state to the ready state, or from the on state to the low power state) in response to receiving the signal. For example, the control circuit 320 may cause the load regulation circuit 310 to change state by routing the signal the control circuit 320 received from the sensor 330 (with or without alteration) and/or sending another signal to the load regulation circuit 310.

The control circuit 320 may receive a signal from the actuator 340. The signal received from the actuator 340 may be a signal indicating an actuation of the actuator 340. The control circuit 320 may receive the signal from the actuator 340 and instruct the load regulation circuit 310 to change state (e.g., from the ready state to the on state) in response to receiving the signal. For example, the control circuit 320 may cause the load regulation circuit 310 to change state by routing the signal the control circuit 320 received from the actuator 340 (with or without alteration) and/or sending another signal to the load regulation circuit 310.

The control circuit 320 may control the switching circuit 350 in accordance with the received signal. The control circuit 320 may control the state of the switching circuit 350, for example, in response to receiving a signal from the sensor 330 and/or the actuator 340. For example, the control circuit 320 may control the power delivered from the AC power source 302 to the electrical load 306 (e.g., via the load regulation circuit 310) by controlling the switching circuit 350 in accordance with a signal received from the sensor 330 and/or the actuator 340.

The sensor 330 may be an occupancy sensor, a vacancy sensor, and/or the like. The sensor 330 may provide automatic control to the load control system 300. The sensor 330 may be part of (i.e., integrated with) the control circuit 320. The sensor 330 may be part of (i.e., integrated with) the load regulation circuit 310. The sensor 330 may be external to the control circuit 320 and/or the load regulation circuit 310 (e.g., a battery-powered wireless occupancy and/or vacancy sensor). The sensor 330 may detect the presence of the user in the vicinity of the electrical load (i.e., occupancy) and/or lack thereof (i.e., vacancy). The sensor 330 may send a signal indicating the presence of the user (or lack thereof) to the control circuit 320 and/or the load regulation circuit 310. For example, if the signal indicating the presence of the user is sent to the control circuit 320, the control circuit 320 may instruct the load regulation circuit 310 to change state in response to the signal, as described herein. The sensor 330 may detect the presence of the user and send the signal indicting the presence of the user to the load regulation circuit 310. Upon receiving the signal indicating the presence of the user from the sensor 330 (either directly and/or indirectly), the load regulation circuit 310 may change state.

The sensor 330 may operate, for example, in an occupied state or a vacant state in response to the detections of occupancy or vacancy conditions, respectively, in the space. If the sensor 330 is in the vacant state and the sensor 330 determines that the space is occupied, then the sensor 330 may change to the occupied state. If the sensor 330 is in the occupied state and the sensor 330 determines that the space is vacant, then the sensor 330 may change to the vacant state.

The sensor 330 may send a signal to the control circuit 320 and/or the load regulation circuit 310 in response to the state of the sensor 330. For example, the sensor 330 may send the signal periodically, or the sensor 330 may send the signal in response to a change of state of the sensor 330, and/or the like. The signal may indicate the presence of the user and/or the signal may indicate the lack of the presence of the user (e.g., after a predetermined period of time).

The actuator 340 may be a device (e.g., mechanical, electrical, electromechanical, and/or the like) that allows a user to control the electrical load 306 (e.g., to provide manual control). For example, if the electrical load 306 is a lighting load, then the actuator 340 may allow the user to turn the electrical load on, turn the electrical load off, dim the electrical load, and/or the like. For example, the actuator 340 may be a switch, such as a toggle switch, a button, a slider switch, and/or the like. The actuator 340 may be a standalone device. For example, the actuator 340 may be a standalone device that may communicate with the control circuit 340 via RF, IR, and/or the like. The actuator 340 may be part of (i.e., integrated with) the control circuit 320 and/or the load regulation circuit 310.

The actuator 340 may trigger a change in the state of the load regulation circuit 310, for example, in response to the actuator 340 being actuated by a user. For example, the actuator 340 may change the load regulation circuit 310 from the ready state to the on state. The actuator 340 may send a signal to the load regulation circuit 310 (either directly and/or indirectly). For example, the actuator 340 may send a signal to the control circuit 320, and the control circuit 320 may instruct the load regulation circuit 310 to change state (e.g., from the ready state to the on state).

The load control system 300 may include a load control device. The load control device may include one or more components of the load control system 300. For example, the load control device may include the control circuit 320. For example, a load control device may include the control circuit 320 and one or more of: the sensor 330, the actuator 340, and/or the switching circuit 350. For example, a load control device may include the control circuit 320, the actuator 340, and the switching circuit 350. For example, a load control device may include the control circuit 320, the sensor 330, the actuator 340, and the switching circuit 350. For example, a load control device may include the control circuit 320 and the actuator 340. The load control device may perform a turn-on procedure, for example, as described with reference to FIGS. 5, 6, 7, and/or 8. An example of a load control device may be a light switch. An example of a load control device may be that described in U.S. patent application Ser. No. 13/828,920, entitled Digital Load Control System Providing Power and Communication via Existing Power Wiring (LUTR_12-22295-P2), now U.S. Pat. No. 9,392,675, which is hereby incorporated by reference herein.

The load control system 300 may include a time clock (not shown). The time clock may be used to determine the time of day and/or the day or the week. The turn-on procedure (e.g., the turn-on procedure described with reference to FIGS. 5, 6, 7, and/or 8) of the load regulation circuit 310 may be changed in accordance with an input from the time clock, such as the time of day and/or the day of the week. For example, the turn-on procedure of the load regulation circuit 310 may have different settings for day and night, for weekdays and weekends, and/or the like. The time clock may be a standalone device and/or part of (i.e., integrated with) another component of the load control system 300 (e.g., the load regulation circuit 310 and/or the control circuit 320).

The load regulation circuit 310 and/or the control circuit 320 may be adapted to control a variety of electrical load types. For example, the load regulation circuit 310 and/or the control circuit 320 may be adapted to control a light-emitting diode (LED) driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit 320 may be coupled to and/or adapted to control multiple types of electrical loads in the load control system 300.

The electrical load 306 may be any of the electrical load types described herein. For example, the electrical load 306 may be a lighting load, such as an incandescent lamp, a halogen lamp, a gas discharge lamp (e.g., a fluorescent lamp), a phosphor-based lamp, a high-intensity discharge (HID) lamp, a light-emitting diode (LED) light source, and/or the like. The electrical load 306 may be a load type other than a lighting load, for example, as described herein.

Figure 4:
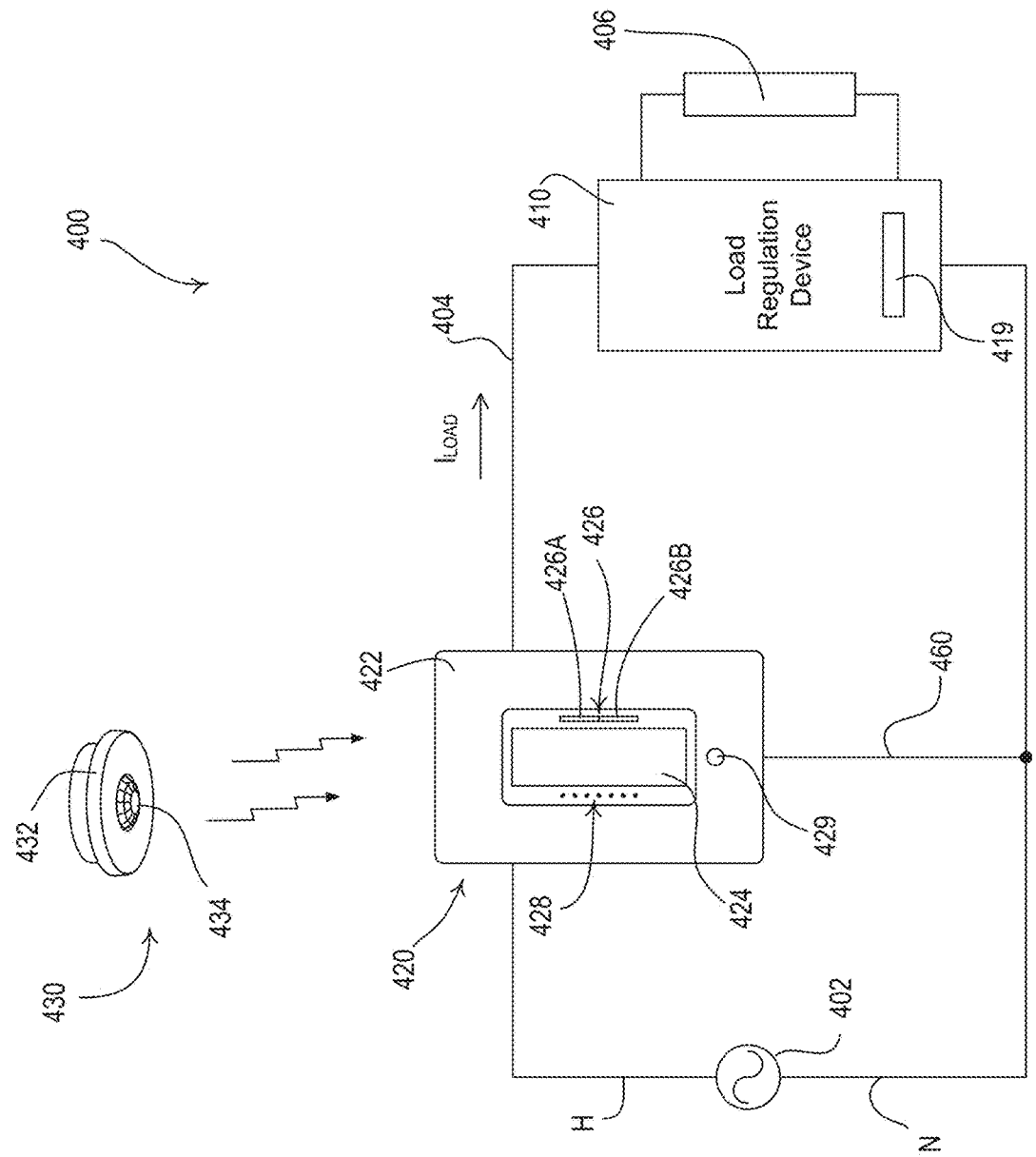
FIG. 4 is a block diagram of an example load control system for performing a turn-on procedure.

FIG. 4 is a diagram illustrating an example load control system 400. The load control system 400 may include an AC power source 402, an electrical load 406, a load regulation device 410, a load control device 420, and a sensor 430. The load control system 400 may be an example of the load control system 300. The AC power source 402 may be an example of the AC power source 302. The electrical load 406 may be an example of the electrical load 306. The load regulation device 410 may include a load regulation circuit, such as the load regulation circuit 310. The load control device 420 may be an example of the load control devices described with reference to FIG. 3. The sensor 430, a sensor 429, and/or a sensor 419 may be an example of the sensor 330. For example, a component of the load control system 400 may perform substantially the same function or functions in substantially the same manner as the corresponding component of the load control system 300. The load regulation device 410 may perform a turn-on procedure, for example, as described herein (e.g., with reference to FIGS. 5, 6, 7, and/or 8).

The load regulation device 410 may be a two-wire load regulation device, which for example, may be coupled between the load control device 420 and the electrical load 406. For example, the load regulation device 410 may be an electronic dimming ballast and the electrical load 406 may be a lighting load, such as a fluorescent lamp. The load regulation device 410 may be coupled to the electrical load 406 for controlling the intensity of the electrical load 406 to a desired lighting intensity $L_{DES}$ between a low-end (e.g., a minimum) intensity $L_{LE}$ (e.g., approximately 1%) and a high-end (e.g., a maximum) intensity $L_{HE}$ (e.g., approximately 100%). The load regulation device 410 may receive power and/or digital communication from a control-hot voltage (e.g., a phase-control voltage) that is generated by the load control device 420. The load regulation device 410 may include the sensor 419. The sensor 419 may detect the presence of a user (or lack thereof) and send a signal indicating the presence of the user to the load control device 420 and/or the load regulation device 410.

The load control device 420 may be coupled in series electrical connection between a hot side H of an alternating-current (AC) power source 402 and the load regulation device 410 via a circuit wiring 404. The load regulation device 420 may be coupled to a neutral side N of the AC power source 402. The load control device 420 may include the sensor 429. The sensor 429 may detect the presence of a user (e.g., or lack thereof) and send a signal indicating the presence of the user to the load control device 420 and/or the load regulation device 410.

The load control device 420 may be a wallbox-mountable device. The load control device 420 may include a faceplate 422. The load control device 420 may include a user interface that may be received in an opening of the faceplate. The user interface may include a toggle actuator 424 and/or an intensity adjustment actuator 426 for receiving user inputs to control the electrical load 406. The load control device 420 may communicate with the load regulation device 410 to cause the electrical load 406 to toggle (i.e., turn off and on) in response to actuations of the toggle actuator 424. For example, the load control device 420 may increase and/or decrease the intensity (i.e., the lighting intensity) of the electrical load 406 in response to actuations of an upper portion 426A and/or a lower portion 426B of the intensity adjustment actuator 426, respectively. The user interface of the load control device 420 may include a plurality of visual indicators 428 (e.g., LEDs), which may be arranged in a linear array and may be illuminated to provide feedback of the intensity of the electrical load 406. The user interface may be an example of an actuator 340 of load control system 300.

The load control system 400 may include one or more input devices. An input device may include a transmitter, such as the sensor 430, a daylight sensor (not shown), a remote control (not shown), and/or the like. For example, an input device may be a sensor that is part of the load control device 420 (e.g., sensor 429), the load regulation device 410 (e.g., sensor 419), or other component of the load control system 400. The input device may be operable to send signals (e.g., digital messages) to the load control device 420, for example, via RF, IR signals, PLC, sound waves, a low voltage wired datalink (e.g., EcoSystem®, QS protocol, etc.), and/or the like. The load control device 420 may turn the electrical load 406 on/off and/or adjust the intensity of the electrical load 406 in response to the signals received from the input device. The load control device 420 may trigger the load regulation device 410 to change state in response to the signals received from an input device.

The sensor 430 may be an occupancy sensor, a vacancy sensor, and/or the like. The sensor 430 may include an enclosure 432 having a lens 434. The sensor 430 may be mountable to a surface (e.g., a ceiling, a wall, etc.) in the vicinity of (i.e., a space around) the load control device 420, the load regulation device 410, and/or the electrical load 406. The sensor 430 may be operable to detect occupancy and/or vacancy conditions, for example, in the vicinity of the load control device 420, the load regulation device 410, and/or the electrical load 406. The sensor 430 may detect the presence of a user (or lack thereof), for example, in the vicinity of the load control device 420, the load regulation device 410, and/or the electrical load 406. The sensor 430 may send a signal indicating the presence of the user to the load control device 420 and/or the load regulation device 410.

The sensor 430 may include an internal occupancy detection circuit (e.g., having a pyroelectric infrared (PIR) detector). The internal occupancy detection circuit may receive infrared energy from a user (e.g., an occupant) in the space via the lens 434 to sense the occupancy condition in the space. The sensor 430 may process the output of the PIR detector to determine whether an occupancy condition (e.g., the presence of the user) and/or a vacancy condition (e.g., the absence of the user) is presently occurring in the space, for example, by comparing the output of the PIR detector to a predetermined occupancy voltage threshold. The internal occupancy detection circuit may include an ultrasonic detector, a microwave detector, or any combination of PIR detectors, ultrasonic detectors, and microwave detectors. The sensor 419 and/or the sensor 429 may operate in a substantially similar manner as the sensor 430.

Figure 5:
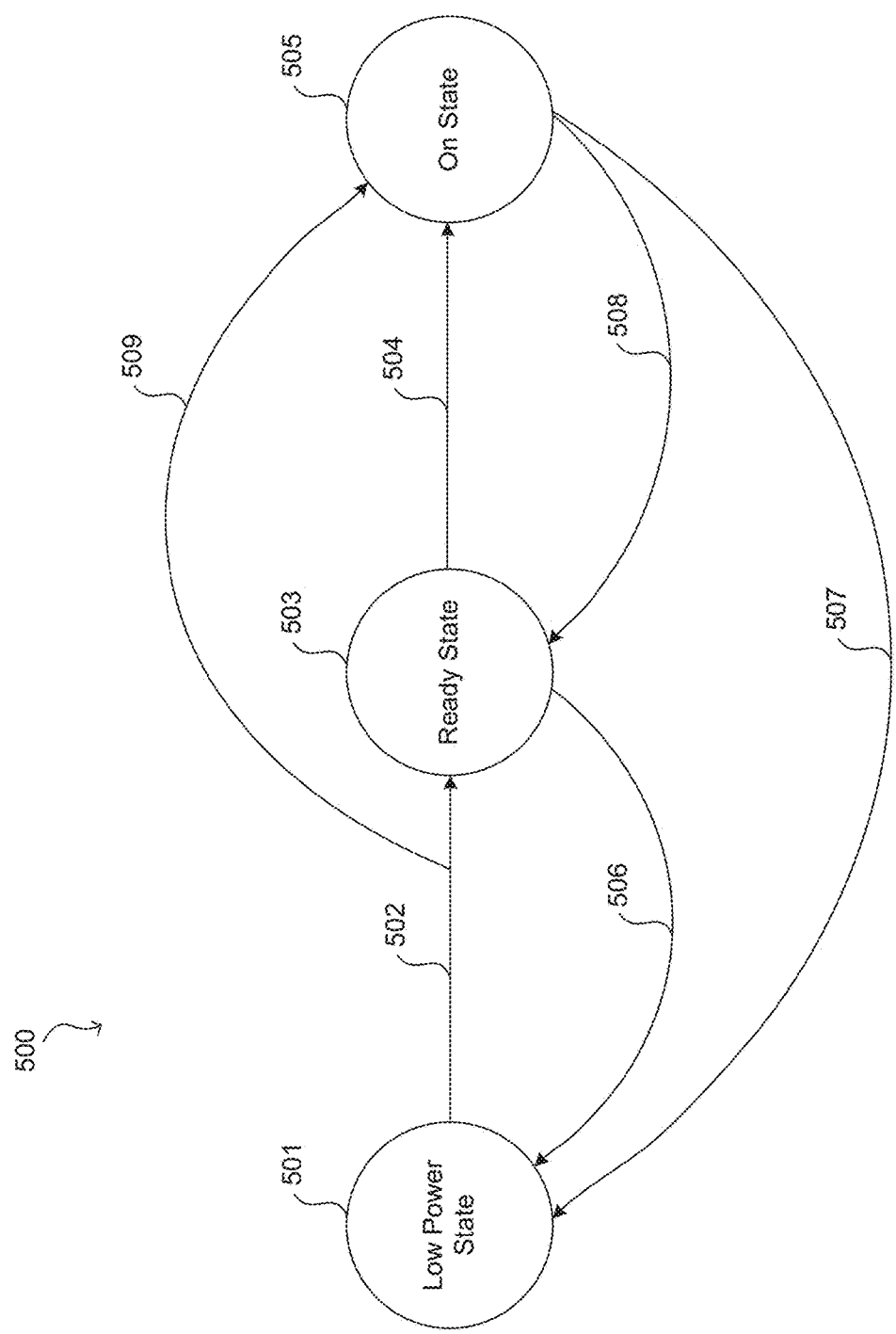
FIG. 5 is a state diagram of an example turn-on procedure.

FIG. 5 is a state diagram illustrating an example of a turn-on procedure 500. The turn-on procedure 500 may be performed by a load control system, for example, the load control system 300, the load control system 400, and/or the like. For example, the turn-on procedure 500 may be performed by a load regulation device of the load control system. The turn-on procedure 500 may include three states, a low power state 501, a ready state 503, and an on state 505.

The low power state 501 may be characterized by the electrical load being unenergized. An example of a low power state 501 may be an off state. In the off state, no power is consumed by the load control device and/or the load regulation device, and the electrical load is unenergized. Another example of a low power state 501 may be an electronic off state. In the electronic off state, a relatively small amount of power is consumed by the load control device and/or load regulation device, and the electrical load is unenergized.

The ready state 503 may be characterized by greater power usage than the low power state 501 and the electrical load being unenergized. For example, the load control device and/or the load regulation device may consume more power in the ready state than in the off state. As such, the ready state 503 may be characterized by greater power usage than the off state and/or the electronic off state, and the electrical load being unenergized. The on state 505 may be characterized by the electrical load being energized. If the electrical load is a lighting load, for example, then the lighting load may not emit light when the load regulation device is in the low power state 501 or the ready state 503, but the lighting load may emit light when the load regulation device is in the on state 505.

The load regulation device may rest in the low power state 501, for example, when the vicinity around the load control system (i.e., around the electrical load) is vacant. The load regulation device may be triggered to transition 502 from the low power state 501 to the ready state 503 in response to receiving an indication of a user's presence. The indication may be a signal. For example, a sensor may detect the presence of the user and send a signal indicating the presence of the user (either directly or indirectly, for example, via a load control device, and/or the like) to the load regulation device. The sensor may be located in the immediate vicinity of the electrical load (e.g., within the same room as the electrical load), in an adjacent vicinity of the electrical load (e.g., a hallway that leads to a room of the electrical load, as shown in FIG. 7), or an adjacent area of the same room as the electrical load (e.g., as shown in FIG. 8), and/or the like. The load regulation device may receive the signal indicating the presence of the user and transition 502 from the low power state 501 to the ready state 503.

The transition 502 from the low power state 501 to the ready state 503 may be characterized by one or more of the following: performing a start-up routine, preheating one or more filaments of the electrical load (e.g., if the electrical load is a gas discharge lamp having filaments), and/or initializing a communication channel between the load regulation device and the control circuit. The establishment of the communication channel may be via RF, IR, PLC, sound waves, a low voltage wired datalink (e.g., EcoSystem®, QS protocol, etc.), and/or the like. The start-up routine may be characterized by one or more of: rendering a controllably conductive device (e.g., of the control circuit) conductive, energizing a microprocessor of the load regulation device, charging a power supply (e.g., comprising one or more capacitors) of the load regulation device, and/or the like. However, the electrical load remains unenergized when the load regulation device is in the ready state 503.

Once in the ready state 503, the load regulation device may wait until it receives a change state instruction. The change state instruction may be a signal received from the load control device, the sensor, and/or an actuator of the load control system, for example, as described herein. The change state instruction may be a signal received in response to an actuation of the actuator (e.g., a switch) of the load control system, for example, as described herein. The change state instruction may be a signal received in response to a sensor detecting the user's presence. The sensor that sends the change state instruction may be a different sensor than the sensor that sends the indication of the user's presence. For example, the sensor that sends the indication of the user's presence may not be in the immediate vicinity of the electrical load, while the sensor that sends the change state instruction may be in the immediate vicinity of the electrical load (e.g., as shown in FIG. 7, FIG. 8, and/or the like). When the change state instruction is received, the load regulation device may transition 504 to the on state 505.

The transition 504 from the ready state 503 to the on state 505 may be characterized by the load regulation device energizing the electrical load. For example, the transition 504 from the ready state 503 to the on state 505 may be characterized by the load regulation device energizing the electrical load and one or more of the following: rendering conductive a controllably conductive device of a load control device, energizing a processor of the load regulation device, charging a power supply of the load regulation device, initializing a communication channel between a load control device and the load regulation device, and preheating one or more filaments of the electrical load. For example, the transition 504 may include those actions that are not performed during transition 502 and/or that are not characterized by the low power state 501 of the load regulation device (e.g., if the low power state is an electronic off state). When the load regulation device is in the on state 505, the electrical load may be energized. For example, if the electrical load is a lighting load, then the lighting load may emit light when the load regulation device is in the on state 505.

If the load regulation device is in the ready state 503 and a change state instruction is not received within a period of time (e.g., a predetermined period of time), then the load regulation device may transition 506 from the ready state 503 to the low power state 501. This may be referred to as a time-out. The transition 506 from the ready state 503 to the low power state 501 may be characterized by the load regulation device stopping the performance of and/or reversing the performance of the one or more of the actions performed during the transition 502 from the low power state 501 to the ready state 503. Once the load regulation device is in the low power state 501, the load control system may use less power than when the load regulation device was in the ready state 503. As such, the time-out may be used to ensure that the load control system conserves power if the load regulation device is not triggered to change from the ready state 503 to the on state 505 within the period of time.

Once in the on state 505, the load regulation device may be triggered to transition 507 from the on state 505 to the low power state 501 or triggered to transition 508 from the on state 505 to the ready state 503. For example, the load regulation device may receive a signal that may trigger the load regulation device to transition 507, 508 from the on state 505 to the low power state 501, or to the ready state 503, respectively. The signal that triggers the load regulation device to transition 507 from the on state 505 to the low power state 501 may be the same as or different from the signal that triggers the load regulation device to transition 508 from the on state 505 to the ready state 503.

The signal that triggers the load regulation device to transition 507, 508 from the on state 505 to the low power state 501, or to the ready state 503, respectively, may be received from a sensor (either directly or indirectly). For example, a sensor may send a signal indicating the lack of the user's presence (e.g., in the vicinity of the electrical load), for example, after a predetermined amount of time. This may be similar to the signal that is used to trigger the load regulation device to transition 502 from the low power state 501 to the ready state 503, except the signal triggering the load regulation device to transition 507, 508 from the on state may indicate the lack of the user's presence.

The signal that triggers the load regulation device to transition 507, 508 from the on state 505 to the low power state 501, or to the ready state 503, respectively, may be received in response to an actuation of an actuator. For example, a user may actuate the actuator, and the actuator may send a signal to the load regulation device (either directly and/or indirectly). For example, the actuator may send a signal to a load control device, and the load control device may send a signal (either the same signal or a different signal) to the load regulation device to trigger the transition 507, 508 from the on state 505 to the low power state 501, or to the ready state 503, respectively. This may be similar to the signal that is used to trigger the load regulation device to transition 504 from the ready state 503 to the on state 505, except for example, the signal triggering the load regulation device to transition 507, 508 from the on state may be in response to the actuation of the actuator in an opposite direction.

If the load regulation device is in the transition 502 from the low power state 501 to the ready state 503, and the load regulation device receives a change state instruction before it reaches the ready state 503, then the load regulation device may transition 509 directly to the on state 505, for example, without ever resting in the ready state 503. Similar to the transition 504 from the ready state 503 to the on state 505, the transition 509 may be triggered in response to the reception of a change state instruction. The change state instruction may be a signal received from the load control device, the sensor, and/or an actuator of the load control system, for example, as described herein. If the load regulation device transitions 509 directly to the on state 505 from the low power state 501, then the load regulation device may perform the actions that characterize the transition 502 along with the actions that characterize transition 504. As such, the transition 509 may differ in that the load regulation device does not sit in the ready state 503 and wait for a change state instruction because the change state instruction is received before the load regulation device reaches the ready state 503.

Figure 6:
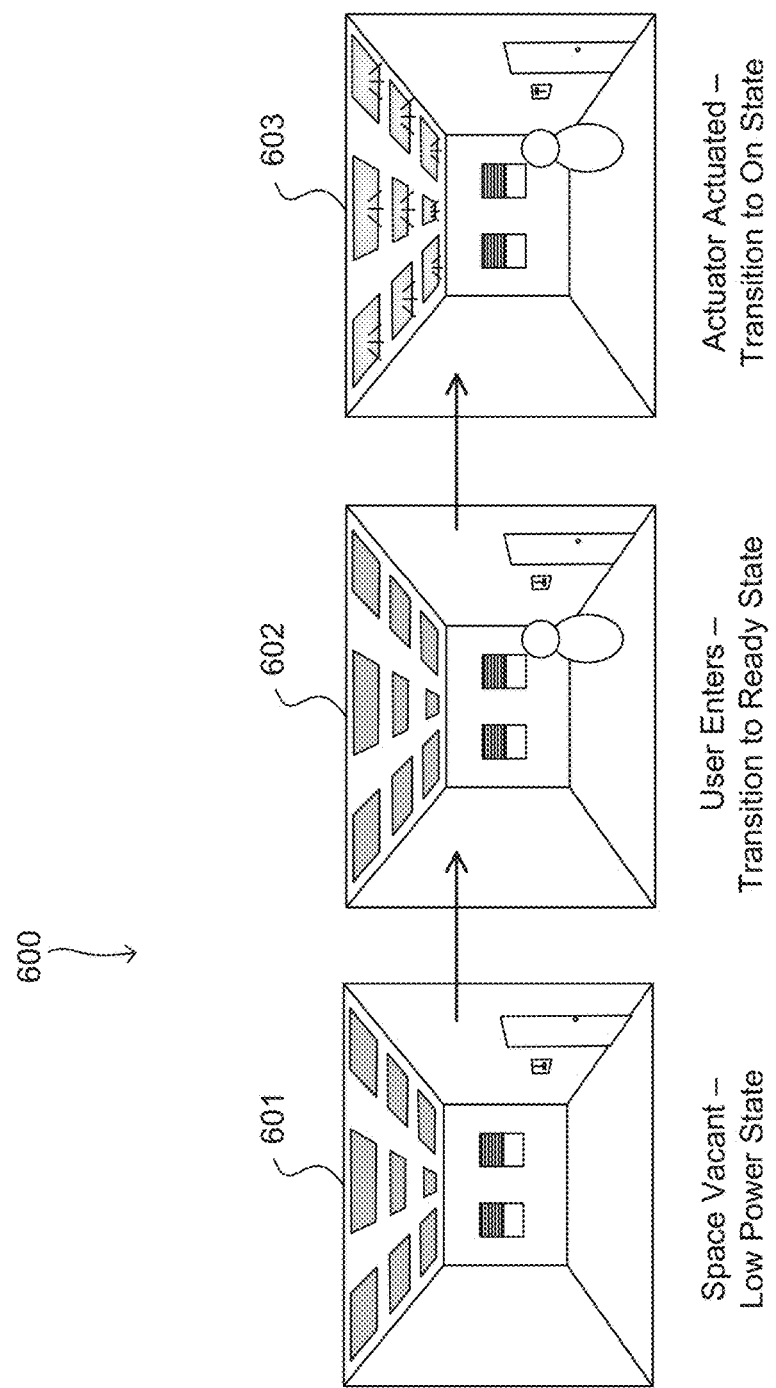
FIG. 6 is a state diagram of an example turn-on procedure.

FIG. 6 is an example of a turn-on procedure 600 for a load regulation device. The turn-on procedure 600 may be the same as the turn-on procedure 500. The load regulation device may be the load regulation circuit 310, the load regulation device 410, and/or the like. As such, the load regulation device may be part of a load control system, such as the load control system 300, the load control system 400, and/or the like. At 601, the vicinity around the electrical load may be vacant, the load regulation device may be in a low power state, and the electrical load may be unenergized. The low power state of the turn-on procedure 600 may be an off state or an electronic off state, for example, as described herein.

At 602, a user may enter the vicinity around the electrical load and the load regulation device may transition from the low power state to the ready state. The load regulation device may be triggered to transition from the low power state to the ready state in response to receiving a signal, for example, as described herein. For example, a sensor may detect the presence of the user within the vicinity of the electrical load. The sensor may send a signal indicating the presence of the user (either directly or indirectly) to the load regulation device. The load regulation device may receive the signal indicating the presence of the user and transition from the low power state to the ready state.

In the turn-on procedure 600, the transition from the low power state to the ready state may be characterized by the load regulation device performing one or more of the following: performing a start-up routine, preheating one or more filaments of the electrical load (e.g., if the electrical load is a gas discharge lamp having filaments), and/or initializing a communication channel between the load regulation device and the control circuit, for example, as described herein. The ready state may be characterized by greater power usage than the low power state. But, the electrical load remains unenergized when the load regulation device is in the ready state. For example, if the electrical load is a lighting load, then the lighting load may not emit light when the load regulation device is in the ready state, for example, as shown in 602.

Once in the ready state, the load regulation device may wait for a change state instruction. A change state instruction may be a signal received from the load control device, the sensor, an actuator, and/or a switch, for example, as described herein. If a change state instruction is not received by the load regulation device within a period of time, then the load regulation device may transition back to the low power state. For example, the load regulation device may time-out.

At 603, the load regulation device may receive the change state instruction. For example, the user may actuate an actuator (e.g., an actuator of the load control device), and the load regulation device may receive a change state instruction accordingly, for example, as described herein (e.g., directly from the actuator, via a load control device, and/or the like). Upon receiving the change state instruction, the load regulation device may transition from the ready state to the on state. The on state of the turn-on procedure 600 may be characterized by the electrical load being energized. For example, if the electrical load is a lighting load, then the lighting load may emit light when the load regulation device is in the on state.

As such, the turn-on procedure 600 may reduce the turn-on time of the electrical load while also saving energy when the electrical load is not in the on state. For example, since the load regulation device may be in the ready state (e.g., as opposed to the low power state) when the actuator is actuated by the user (e.g., at 603), the load regulation device's transition to the on state may be of a shorter time duration. Further, since the load regulation device waits in the low power state (e.g., as opposed to the ready state) when the vicinity around the electrical load is vacant (e.g., at 601), the load regulation device may save power.

Figure 7:
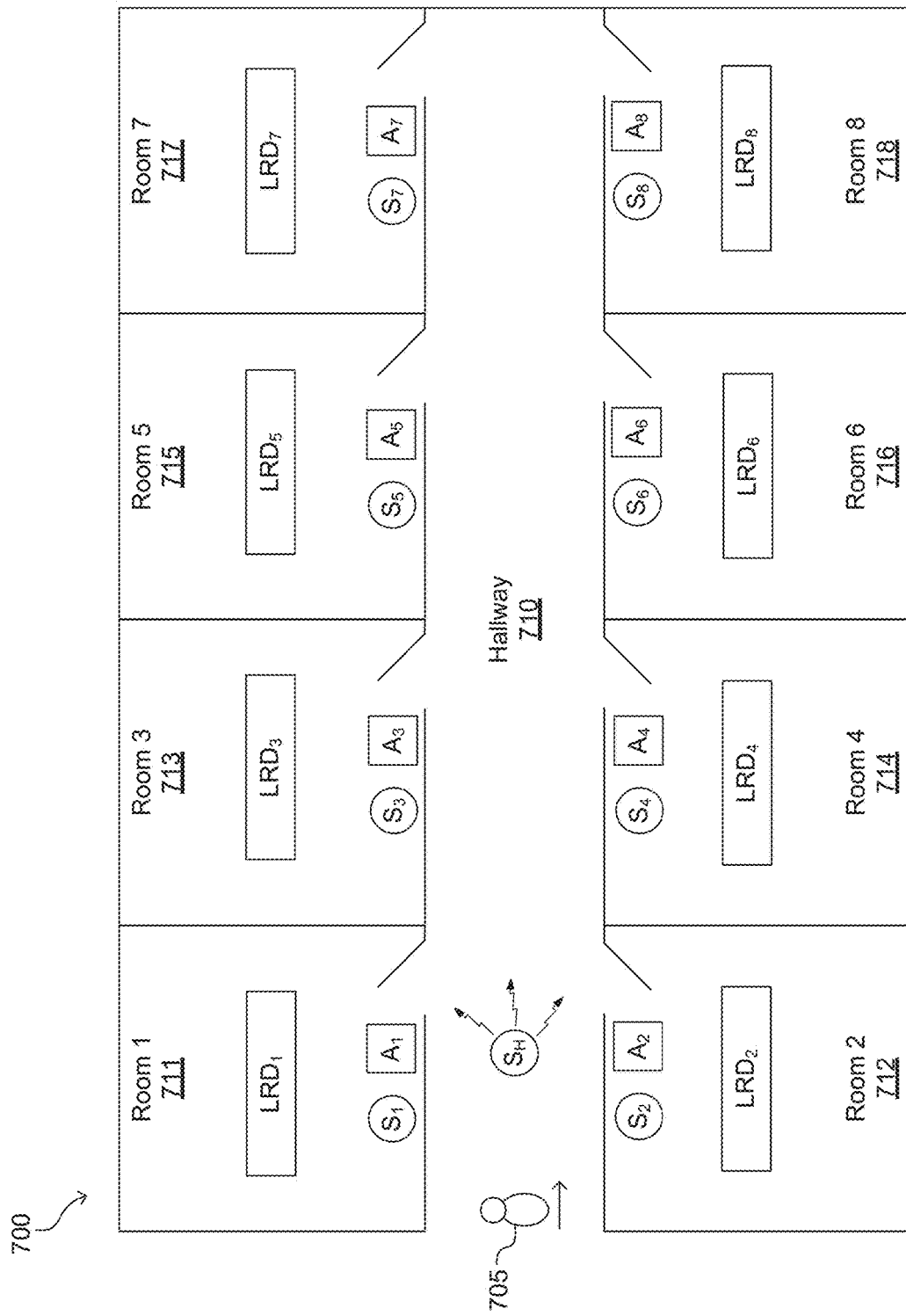
FIG. 7 is a diagram of an example configuration of a load control system that may use a turn-on procedure.

FIG. 7 is a diagram of an example configuration of a load control system 700 that may use a turn-on procedure. For example, the load control system 700 (e.g., via a load regulation device of the load control system 700) may use the turn-on procedure 500, the turn-on procedure 600, and/or the like. The load control system 700 may be an example of the load control system 300, the load control system 400, and/or the like, and as such, similar reference names may be used. The load control system 700 may comprise a hallway sensor $S_H$, one or more room sensors $S_1$-$S_8$, one or more actuators $A_1$-$A_8$, and/or one or more load regulation devices $LRD_1$-$LRD_8$. The load control system 700 may be configured within a building that includes a hallway 710 and one or more rooms 711-718 that extend off of the hallway 710. The load control system 700 may include more or less than the number of sensors $S_1$-$S_8$, actuators $A_1$-$A_8$, and/or load regulation devices $LRD_1$-$LRD_8$ than are illustrated in FIG. 7. Although referred to as actuators $A_1$-$A_8$, one or more of the actuators $A_1$-$A_8$ may be incorporated within one or more load control devices, for example, as described herein.

Each of the rooms 711-718 may include one or more electrical loads (not shown) that may be controlled by a corresponding load regulation device $LRD_1$-$LRD_8$, for example, as described herein. Before a user 705 enters the hallway 710, the load regulation devices $LRD_1$-$LRD_8$ may be in a low power state. For example, the low power state may be an off state and/or an electronic off state. The low power state may be characterized by the electrical loads in the rooms 711-718 being unenergized. For example, if the electrical loads are lighting loads, then the electrical loads in the rooms 711-718 may not emit light when the load regulation devices $LRD_1$-$LRD_8$ are in the low power state.

When a user 705 enters the vicinity of the hallway sensor $S_H$, the hallway sensor $S_H$ may detect the user's presence and send (i.e., either transmit or broadcast) a signal indicating the user's presence. The signal indicating the user's presence may be received by one or more load regulation devices $LRD_1$-$LRD_8$, for example, directly from the hallway sensor $S_H$, or indirectly via a respective room sensor $S_1$-$S_8$, a respective actuator $A_1$-$A_8$ (or a load control device including the respective actuator), and/or the like.

Upon receiving the indication of the user's presence from the hallway sensor $S_H$, a load regulation device (e.g., one or more of the load regulation devices $LRD_1$-$LRD_8$) may transition from the low power state to the ready state. The transition from the low power state to the ready state may be characterized by one or more of the following: performing a start-up routine, preheating one or more filaments of the electrical load (e.g., if the electrical load is a gas discharge lamp having filaments), and/or initializing a communication channel between the load regulation device and the control circuit, for example, as described herein. The ready state may be characterized by greater power usage than the low power state. The electrical load in the room of the load regulation device may remain unenergized when the load regulation device is in the ready state. As such, the load control system 700 may use the hallway sensor $S_H$ to trigger one or more of the load regulation devices $LRD_1$-$LRD_8$ to transition from the low power state to a ready state when a user enters the hallway 710 adjacent the respective rooms 711-718.

Once in the ready state, the load regulation devices $LRD_1$-$LRD_8$ may wait until they receive a change state instruction. The change state instruction may be a signal received from the room sensor $S_1$-$S_8$ and/or the actuator $A_1$-$A_8$ in the room of the load regulation device $LRD_1$-$LRD_8$. For example, the load regulation device $LRD_1$ may receive a signal from the hallway sensor $S_H$ (either directly or indirectly) that may trigger it to transition from the low power state to the ready state. The load regulation device $LRD_1$ may wait in the ready state until it receives a change state instruction. The load regulation device $LRD_1$ may receive a change state instruction from the sensor $S_1$ and/or the actuator $A_1$ in the room 711. For example, the change state instruction for the load regulation device $LRD_1$ may be a signal received in response to an actuation of the actuator $A_1$ by a user who enters the room 711, for example, as described herein. The change state instruction may be a signal received in response to the sensor $S_1$ detecting the user's presence in the room 711, for example, as described herein. Upon receiving the change state instruction, the load regulation device $LRD_1$ may transition from the ready state to the on state.

The transition from the ready state to the on state may be characterized by the load regulation device $LRD_1$ energizing the electrical load. For example, the transition from the ready state to the on state may be characterized by the load regulation device $LRD_1$ energizing the electrical load and one or more of the following: rendering conductive a controllably conductive device of a load control device, energizing a processor of the load regulation device $LRD_1$, charging a power supply of the load regulation device $LRD_1$, initializing a communication channel between a load control device and the load regulation device $LRD_1$, and preheating one or more filaments of the electrical load. When the load regulation device $LRD_1$ is in the on state, the electrical load in the room 711 may be energized. For example, if the electrical load is a lighting load, then the lighting load may emit light in the room 711 when the load regulation device $LRD_1$ is in the on state.

If the load regulation device $LRD_1$ is in the ready state and a change state instruction is not received within a period of time (e.g., after a predetermined period of time), then the load regulation device $LRD_1$ may transition from the ready state to the low power state. This may be referred to as a time-out. For example, the load regulation device $LRD_1$ may time-out if the user 705 does not enter the room 711 and is not detected by the sensor $S_1$ within the time period and/or if the user 705 does not actuate the actuator $A_1$ within the period of time. As such, the load control system 700 may reduce the turn-on time of the electrical load in room 711 by transitioning the load regulation device $LRD_1$ from the low power state to the ready state when the user 705 enters the hallway 710 adjacent to the room 711. And the load control system 700 may save power by allowing the load regulation device $LRD_1$ to transition to (and/or stay in) the low power state when the hallway 710 and/or the room 711 are vacant.

Figure 8:
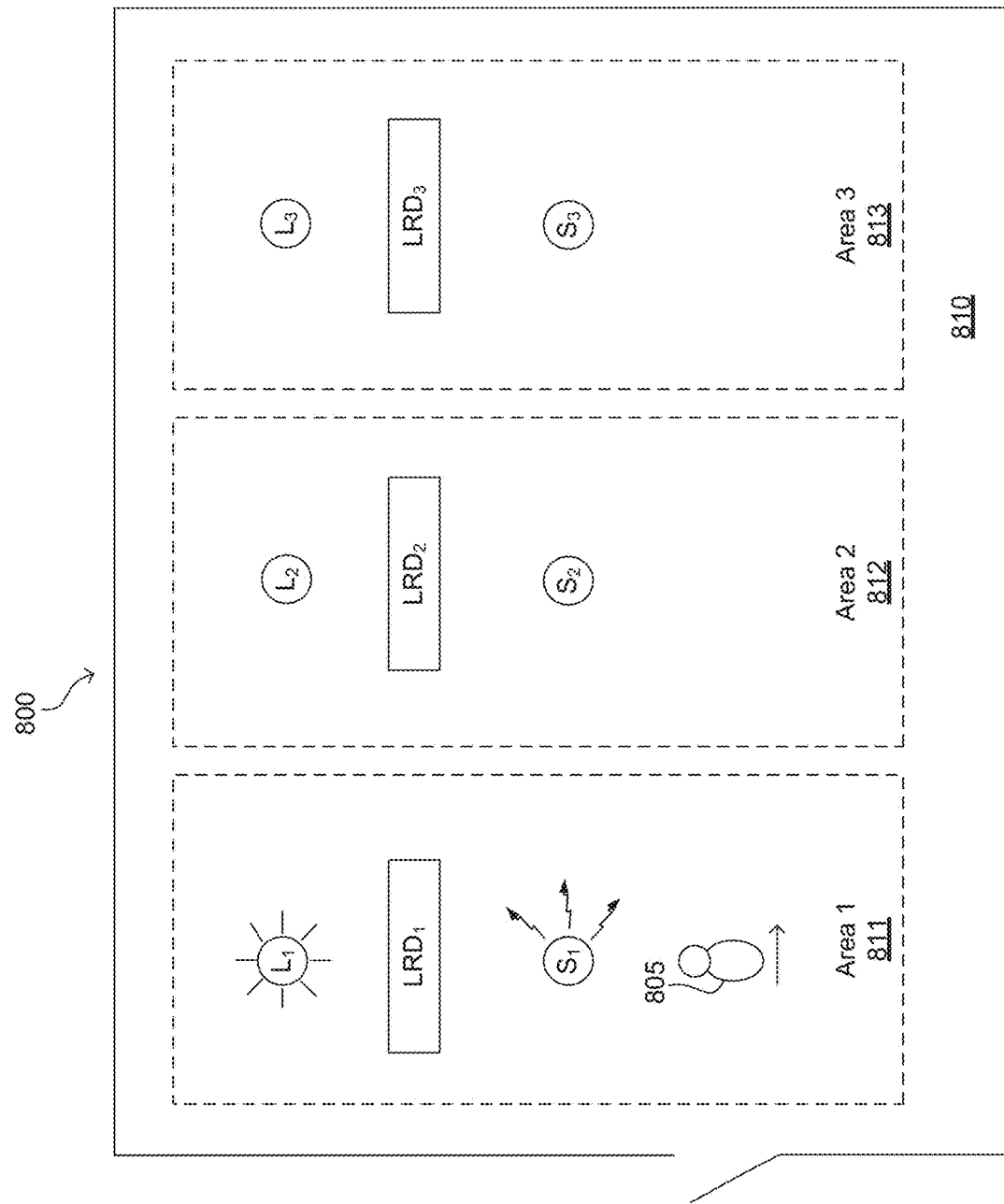
FIG. 8 is a diagram of an example configuration of a load control system that may use a turn-on procedure.

FIG. 8 is a diagram of an example configuration of a load control system 800 that may use a turn-on procedure. For example, the load control system 800 (e.g., a load regulation device of the load control system 800) may use the turn-on procedure 500, the turn-on procedure 600, and/or the like. The load control system 800 may be an example of the load control system 300, the load control system 400, and/or the like, and as such, similar reference names may be used. The load control system 800 may comprise one or more sensors $S_1$-$S_3$, one or more electrical loads $L_1$-$L_3$, and/or one or more load regulation devices $LRD_1$-$LRD_3$. The load control system 800 may be configured such that a first load regulation device $LRD_1$, a first sensor $S_1$, and a first electrical load $L_1$ may be assigned to a first area 561. An area (e.g., areas 811-813) may refer to a grouping of one or more load regulation devices, sensors, actuators, and/or electrical loads. The load control system 800 may be configured within a room 810. The load control system 800 may include more or less than the number of areas 811-813, sensors $S_1$-$S_3$, electrical loads $L_1$-$L_3$, and/or load regulation devices $LRD_1$-$LRD_3$ illustrated in FIG. 8.

Before a user 805 enters the room 810, the load regulation device $LRD_1$ may be in a ready state. For example, a hallway sensor (not shown) may have detected the user's presence and may have triggered the load regulation device $LRD_1$ to transition from a low power state to the ready state before the user 805 entered the room 810 (e.g., as described with reference to FIG. 7). The ready state may be characterized by greater power usage than the low power state and the electrical load $L_1$ being unenergized. For example, if the electrical load $L_1$ is a lighting load, then the electrical load $L_1$ may not emit light when the load regulation device $LRD_1$ is in the ready state.

When the user 805 enters the room 810 and is in the vicinity of the sensor $S_1$ of the first area 811, the sensor $S_1$ may detect the user's presence and send (i.e., either transmit or broadcast) a signal indicating the user's presence. The signal indicating the user's presence may be received (either directly or indirectly) by the load regulation device $LRD_1$ of the first area 811. The reception of the signal indicating the user's presence from the sensor $S_1$ may trigger the load regulation device $LRD_1$ to transition from the ready state to the on state. In one or more embodiments, the load regulation device $LRD_1$ may be in the low power state when the user 805 enters the area 811. The reception of the signal indicating the user's presence may trigger the load regulation device $LRD_1$ to transition from the low power state to the ready state. The load regulation device $LRD_1$ may then be triggered to transition from the ready state to the on state in response to an actuation of an actuator (not shown) of the first area 811.

Before the user 805 enters the room 810, the load regulation devices $LRD_2$-$LRD_3$ of the second and third areas 812-813 (e.g., the areas of the room 810 other than the first area 811) may be in a low power state. For example, the low power state may be an off state and/or an electronic off state. The low power state may be characterized by the electrical loads $L_2$-$L_3$ being unenergized. For example, if the electrical loads $L_2$-$L_3$ are lighting loads, then the electrical loads $L_2$-$L_3$ may not emit light when the load regulation devices $LRD_2$-$LRD_3$ are in the low power state.

When the user 805 enters the room 810 and is in the vicinity of the sensor $S_1$ of the first area 811, the sensor $S_1$ may detect the user's presence and send (i.e., either transmit or broadcast) a signal indicating the user's presence. The signal indicating the user's presence may be received by one or more of the load regulation devices $LRD_2$-$LRD_3$ of the other areas 812-813 of the room 810, for example, either directly from the sensor $S_1$, or indirectly via a respective sensor $S_2$-$S_3$ of the other areas 812-813 of the room 810, a respective actuator (not shown) of the other areas 812-813 of the room 810 (e.g., or load control device including the actuator), and/or the like.

Upon receiving the indication of the user's presence from the sensor $S_1$ of the first area 811, a load regulation device (e.g., $LRD_2$-$LRD_3$) of another area 812-813 of the room 810 may transition from the low power state to the ready state. The transition from the low power state to the ready state may be characterized by one or more of the following: performing a start-up routine, preheating one or more filaments of the electrical load (e.g., if the electrical load is a gas discharge lamp having filaments), and/or initializing a communication channel between the load regulation device and the control circuit, for example, as described herein. The ready state may be characterized by greater power usage than the low power state. The electrical load in the area of the load regulation device may remain unenergized when the load regulation device is in the ready state. As such, the load control system 800 may use the sensor $S_1$ of the first area 811 to trigger one or more of the load regulation devices $LRD_2$-$LRD_3$ of the other areas 812-813 of the room 810 to transition from the low power state to a ready state when a user enters the first area 811 of the room 810.

Once in the ready state, the load regulation devices $LRD_2$-$LRD_3$ of the other areas 812-813 of the room 810 may wait until they receive a change state instruction. The change state instruction may be a signal received from the sensor $S_2$-$S_3$ of the respective area 812-813. For example, the load regulation device $LRD_2$ of the second area 812 may receive a signal from the sensor $S_1$ (either directly or indirectly) that may trigger it to transition from the low power state to the ready state. The load regulation device $LRD_2$ may wait in the ready state until it receives a change state instruction. The load regulation device $LRD_2$ may receive a change state instruction from the sensor $S_2$ of the second area 812. For example, the change state instruction for the load regulation device $LRD_2$ may be a signal received in response to the sensor $S_2$ detecting the user's presence in the second area 812. Upon receiving the change state instruction, the load regulation device $LRD_2$ may transition from the ready state to the on state.

The transition from the ready state to the on state may be characterized by the load regulation device $LRD_2$ energizing the electrical load $L_2$ of the second area 812. For example, the transition from the ready state to the on state may be characterized by the load regulation device $LRD_2$ energizing the electrical load $L_2$ and one or more of the following: rendering conductive a controllably conductive device of a load control device, energizing a processor of the load regulation device $LRD_2$, charging a power supply of the load regulation device $LRD_2$, initializing a communication channel between a load control device and the load regulation device $LRD_2$, and preheating one or more filaments of the electrical load $L_2$. When the load regulation device $LRD_2$ is in the on state, the electrical load $L_2$ in the area 812 may be energized, but for example, the electrical load $L_3$ of the third area 813 may remain unenergized and the load regulation device $LRD_3$ may remain in the ready state and wait for a change state instruction.

If a load regulation device (e.g., $LRD_2$-$LRD_3$) of an area (e.g., 812-813) of the room 810 is in the ready state and a change state instruction is not received within a period of time (e.g., after predetermined period of time), then the load regulation device may transition from the ready state to the low power state. This may be referred to as a time-out. For example, the load regulation device $LRD_2$ may time-out if the user 805 does not enter the second area 812 of the room 810 and is not detected by the sensor $S_2$ within the time period. As such, the load control system 800 may reduce the turn-on time of the electrical load $L_2$ in the second area 812 of the room 810 by transitioning the load regulation device $LRD_2$ from the low power state to the ready state when the user 805 is detected in an adjacent area 811 of the room 810. And the load control system 800 may save power by allowing the load regulation device $LRD_2$ to transition to (and/or stay in) the low power state when the second area 812 and/or the room 810 are vacant.

Figure 9:
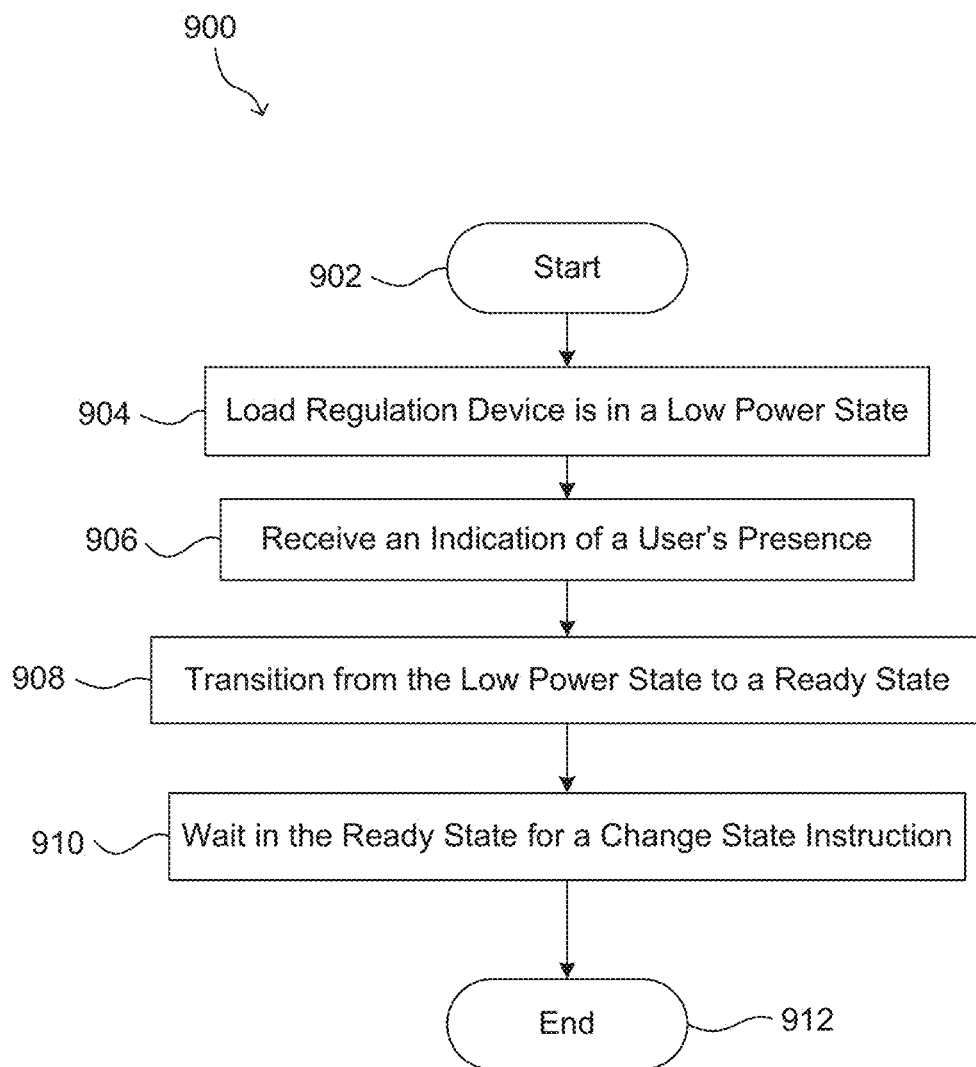
FIG. 9 is a flowchart of an example turn-on procedure.

FIG. 9 is a diagram of an example of a turn-on procedure 900. The turn-on procedure 900 may be performed by a load regulation device (e.g., load regulation circuit 310, load regulation device 410, and/or the like), a load control device (e.g., a load control device including the control circuit 320, the load control device 420, and/or the like), and/or another component of a load control system (e.g., load control system 300, load control system 400, and/or the like). The turn-on procedure 900 may be similar to one or more of the turn-on procedures described herein, for example, with reference to FIGS. 5, 6, 7, and/or 8.

The turn-on procedure 900 may start at 902. At 904, the load regulation device may be in a low power state, for example, as described herein. The low power state may be characterized by an electrical load of the load regulation device being unenergized. An example of a low power state may be an off state. In the off state, no power is consumed by the load control device and/or the load regulation device, and the electrical load is unenergized. Another example of a low power state may be an electronic off state. In the electronic off state, a relatively small amount of power is consumed by the load control device and/or load regulation device, and the electrical load is unenergized.

At 906, the load regulation device may receive an indication of a user's presence, for example, as described herein. The indication may be a signal. For example, a sensor may detect the presence of the user and send a signal indicating the presence of the user (e.g., either directly, or indirectly via a load control device, and/or the like) to the load regulation device. The sensor may be located in the immediate vicinity of the electrical load (e.g., within the same room as the electrical load), in an adjacent vicinity of the electrical load (e.g., a hallway that leads to a room of the electrical load, as shown in FIG. 7), or an adjacent area of the same room as the electrical load (e.g., as shown in FIG. 8), and/or the like.

Upon receiving the indication of the user's presence, the load regulation device may transition from the low power state to a ready state at 908. The transition from the low power state to the ready state may be characterized by one or more of the following: performing a start-up routine, preheating one or more filaments of the electrical load (e.g., if the electrical load is a gas discharge lamp having filaments), and/or initializing a communication channel between the load regulation device and the control circuit. The establishment of the communication channel may be via RF, IR, PLC, sound waves, a low voltage wired datalink (e.g., Ecosystem®, QS protocol, etc.), and/or the like. The start-up routine may be characterized by one or more of: rendering a controllably conductive device (e.g., of the control circuit) conductive, energizing a microprocessor of the load regulation device, charging a power supply (e.g., comprising one or more capacitors) of the load regulation device, and/or the like. The electrical load remains unenergized when the load regulation device is in the ready state.

Once in the ready state, the load regulation device may wait until it receives a change state instruction at 910. For example, by waiting in the ready state (e.g., as opposed to the low power state), the turn-on time of the electrical load may be reduced. Further, since the load regulation waits in the low power state (e.g., as opposed to the ready state) when the vicinity around the electrical load is vacant, the load regulation device may save power. The turn-on procedure 900 may end at 912.

Figure 10:
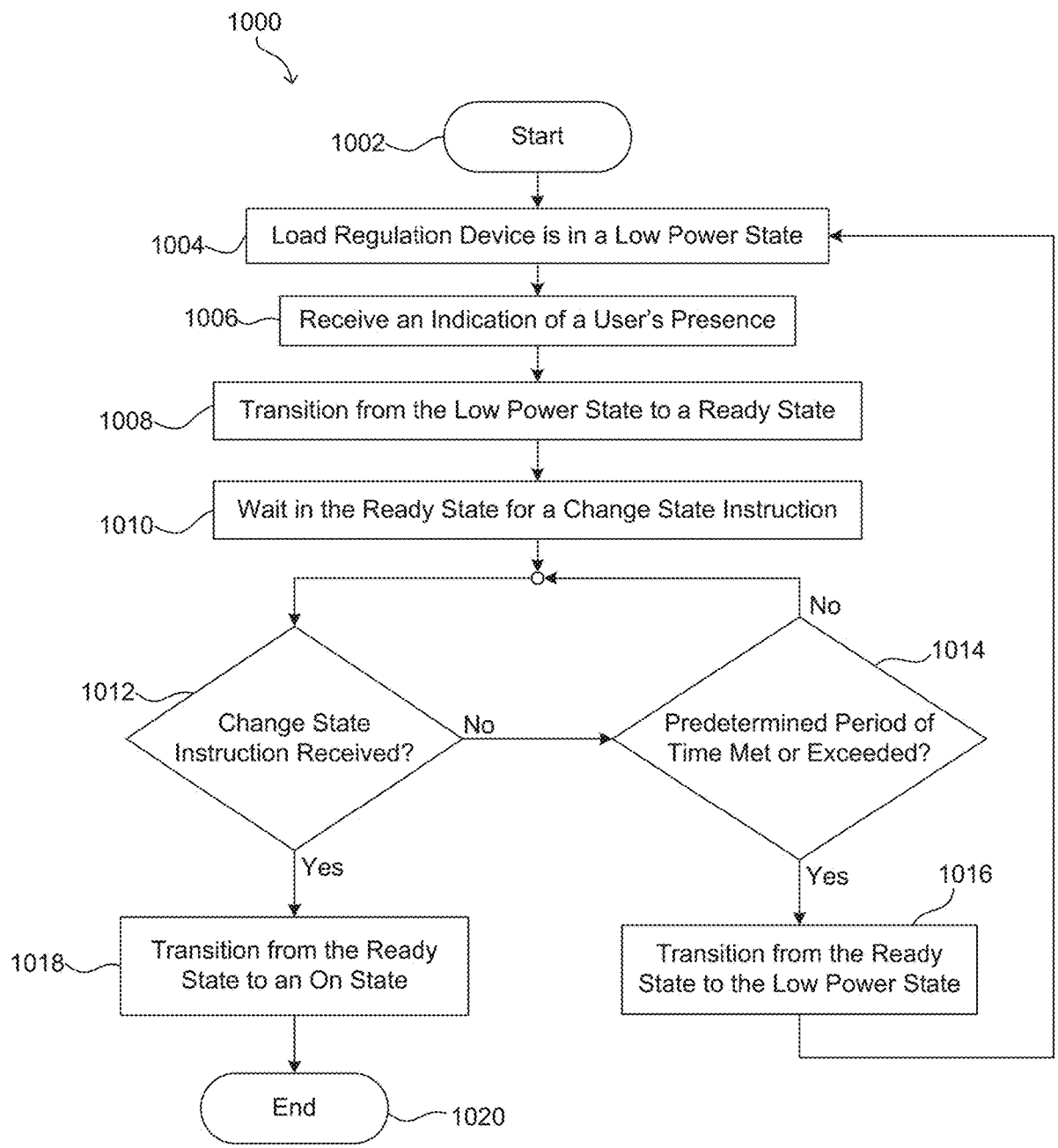
FIG. 10 is a flowchart of an example turn-on procedure.

FIG. 10 is a diagram illustrating an example of a turn-on procedure 1000. The turn-on procedure 1000 may be performed by a load regulation device (e.g., load regulation circuit 310, load regulation device 410, and/or the like), a load control device (e.g., a load control device including the control circuit 320, the load control device 420, and/or the like), and/or another component of a load control system (e.g., load control system 300, load control system 400, and/or the like). The turn-on procedure 1000 may be similar to one or more of the turn-on procedures described herein, for example, with reference to FIGS. 5, 6, 7, and/or 8.

1002 through 1010 of the turn-on procedure 1000 may be the same as 902 through 910 of the turn-on procedure 900. The description of the turn-on procedure 1000 may begin with 1010, wherein the load regulation device may be in the ready state and may be waiting for a change state instruction.

At 1012, it may be determined whether a change state instruction is received. The change state instruction may be a signal received from the load control device, a sensor, and/or an actuator of the load control system, for example, as described herein. The change state instruction may be a signal received in response to an actuation of the actuator (e.g., a switch) of the load control system, for example, as described herein. The change state instruction may be a signal received in response to a sensor detecting the user's presence. The sensor that sends the change state instruction may be a different sensor than the sensor that sends the indication of the user's presence. For example, the sensor that sends the indication of the user's presence may not be in the immediate vicinity of the electrical load, while the sensor that sends the change state instruction may be in the immediate vicinity of the electrical load (e.g., as shown in FIG. 7, FIG. 8, and/or the like).

If it is determined that a change state instruction is not received at 1012, then the turn-on procedure 1000 may proceed to 1014. At 1014, it may be determined whether a predetermined period of time has been met or exceeded. For example, the load regulation device (e.g., or other component of a load control system) may start a timer after the load regulation device transitions from the low power state to the ready state. The load regulation device may use the timer to minimize the amount of time it waits in the ready state without receiving a change state instruction. If the predetermined period of time is not met or exceeded, then the turn-on procedure 1000 may return to 1012 and the load regulation device may determine whether a change state instruction has been received. If the predetermined period of time is met or exceeded at 1014, then the load regulation device may transition from the ready state back to the low power state at 1016, and the turn-on procedure 1000 may return to 1004.

The transition from the ready state to the low power state at 1016 may be characterized by the load regulation device stopping the performance of and/or reversing the performance of the one or more of the actions performed during the transition from the low power state to the ready state. Once the load regulation device is in the low power state, the load control system may use less power than when the load regulation device was in the ready state. As such, the time-out may be used to ensure that the load control system conserves power if the load regulation device is not triggered to transition to the on state (i.e., receive a change state instruction at 1012) within the period of time.

If is determined that a change state instruction is received at 1012, then the turn-on procedure 1000 may proceed to 1018. At 1018, the load regulation device may transition from the ready state to the on state. The transition from the ready state to the on state may be characterized by the load regulation device energizing the electrical load. For example, the transition from the ready state to the on state may be characterized by the load regulation device energizing the electrical load and one or more of the following: rendering conductive a controllably conductive device of a load control device, energizing a processor of the load regulation device, charging a power supply of the load regulation device, initializing a communication channel between a load control device and the load regulation device, and preheating one or more filaments of the electrical load. When the load regulation device is in the on state, the electrical load may be energized. For example, if the electrical load is a lighting load, then the lighting load may emit light when the load regulation device is in the on state. After the load regulation device changes to the on state, the turn-on procedure 1000 may end at 1020.

Figure 11:
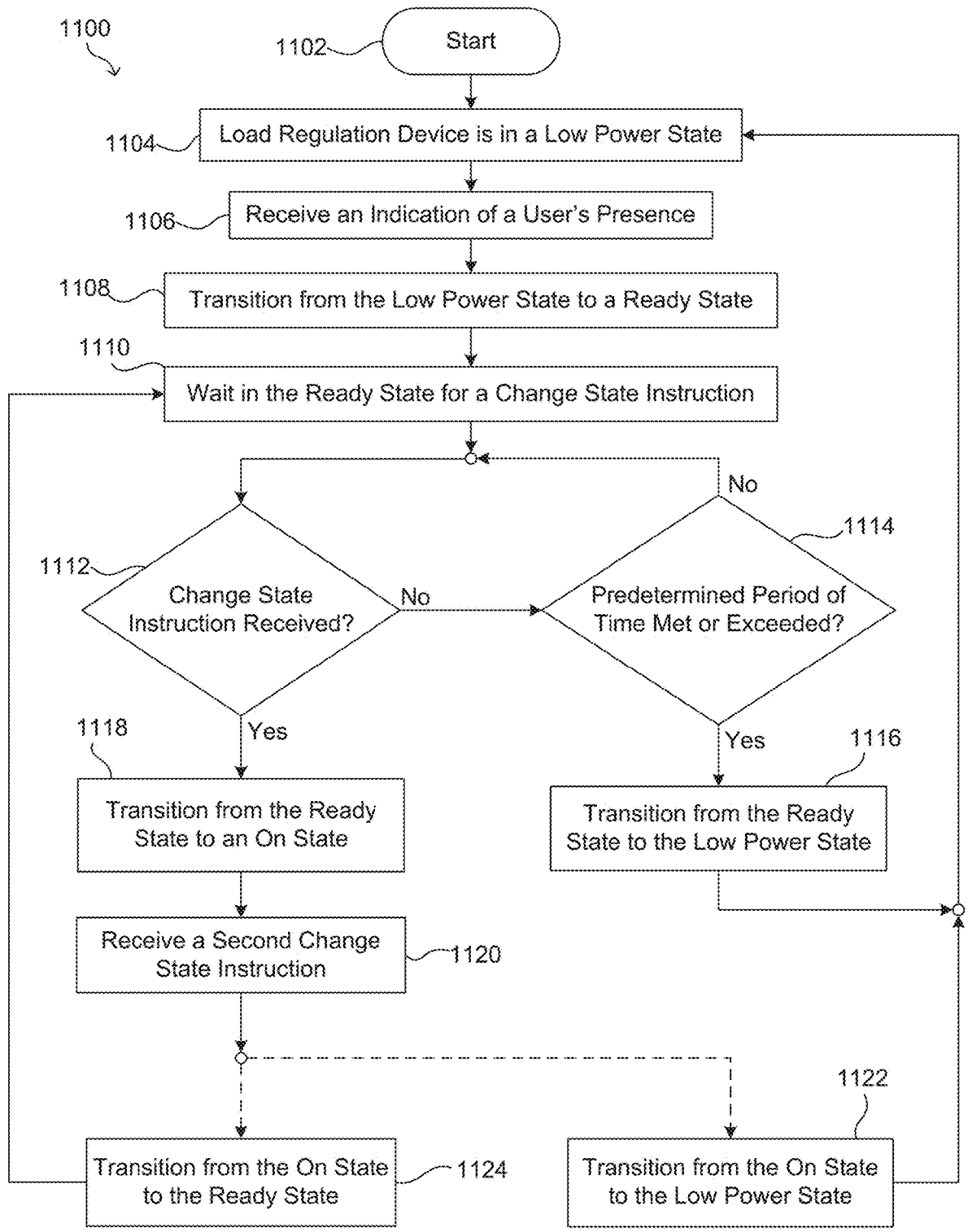
FIG. 11 is a flowchart of an example turn-on procedure.

FIG. 11 is a diagram illustrating an example of a turn-on procedure. The turn-on procedure 1100 may be performed by a load regulation device (e.g., load regulation circuit 310, load regulation device 410, and/or the like), a load control device (e.g., a load control device including the control circuit 320, the load control device 420, and/or the like), and/or another component of a load control system (e.g., load control system 300, load control system 400, and/or the like). The turn-on procedure 1100 may be similar to one or more of the turn-on procedures described herein, for example, with reference to FIGS. 5, 6, 7, and/or 8.

1102 through 1110 of the turn-on procedure 1100 may be the same as 1002 through 1010 of the turn-on procedure 1000 and 902 through 910 of the turn-on procedure 900. 1112 through 1118 of the turn-on procedure 1100 may be the same as 1012 through 1018 of the turn-on procedure 1000. The description of the turn-on procedure 1100 may begin with 1118, wherein the load regulation device may transition from the ready state to the on state in response to receiving a change state instruction.

At 1120, the load regulation device may receive a second change state instruction. The second change state instruction may be received by the load regulation device from a sensor (either directly or indirectly). For example, a sensor may send a signal indicating the lack of the user's presence (e.g., in the vicinity of the electrical load), for example, after a predetermined amount of time. This may be similar to the signal that is used to trigger the load regulation device to transition from the low power state to the ready state at 1108, except the second change state instruction may indicate the lack of the user's presence.

The second change state instruction may be received by the load regulation device in response to an actuation of an actuator. For example, a user may actuate the actuator and the actuator may send a signal to the load regulation device (either directly and/or indirectly). For example, the actuator may send a signal to a load control device and the load control device may send a signal (either the same signal or a different signal) to the load regulation device. This may be similar to the signal that is used to trigger the load regulation device to transition from the ready state to the on state at 1118, except for example, the signal triggering the load regulation device to transition from the on state may be in response to the actuation of the actuator in an opposite direction.

The second change state instruction may trigger the load regulation device to transition from the on state to the ready state at 1124, or the second change state instruction may trigger the load regulation device to transition from the on state to the low power state at 1122. The second change state instruction that triggers the load regulation device to transition from the on state to the low power state at 1122 may be the same as or different from the signal that triggers the load regulation device to transition from the on state to the ready state at 1124.

At 1124, the load regulation device may transition from the on state to the ready state. The transition from the on state to the ready state at 1124 may be characterized by the load regulation device stopping the performance of and/or reversing the performance of the one or more of the actions performed during the transition from the ready state to the on state at 1118. After the load regulation device transitions to the ready state, the turn-on procedure 1100 may return to 1110.

At 1122, the load regulation device may transition from the on state to the low power state. The transition from the on state to the low power state at 1122 may be characterized by the load regulation device stopping the performance of and/or reversing the performance of the one or more of the actions performed during the transition from the low power state to the ready state at 1108 and/or one or more of the actions performed during the transition from the ready state to the on state at 1118. After the load regulation device transitions to the low power state, the turn-on procedure 1100 may return to 1104.

The invention claimed is:

1. A load regulation device for controlling an electrical load, the load regulation device comprising:
   a load regulation circuit configured to control the electrical load; and
   a control circuit configured to control the load regulation circuit to control an amount of power delivered to the electrical load;
   wherein the control circuit is configured to operate in at least a low-power state during which the electrical load is unenergized and an on state during which the electrical load is energized, and wherein the control circuit is further configured to:
      receive an indication of a user's presence while operating in the low-power state;
      in response to receiving the indication, start preparing for energizing the electrical load while the electrical load remains unenergized; and
      enter the on state to control the load regulation circuit to energize the electrical load if a change state instruction is received within a first predetermined period of time after the control circuit starts to prepare for energizing the electrical load, or stop preparing for energizing the electrical load if the change state instruction is not received within the first predetermined period of time.

2. The load regulation device of claim 1, wherein the control circuit being configured to start preparing for energizing the electrical load comprises the control circuit being configured to perform one or more of the following: rendering conductive a controllably conductive device, charging a power supply, or initializing a communication channel.

3. The load regulation device of claim 1, wherein, during the on state, the control circuit is further configured to control the load regulation circuit to stop energizing the electrical load in response to detecting an actuation of an actuator or in response to receiving an indication of a lack of the user's presence in a vicinity of the electrical load for a second predetermined period of time.

4. The load regulation device of claim 3, wherein at least one of the first predetermined period of time or the second predetermined period of time is based on at least one of a time of day or day of the week.

5. The load regulation device of claim 3, wherein the control circuit is configured to receive one or more signals from an external device, and to detect the actuation of the actuator via the one or more signals received from the external device.

6. The load regulation device of claim 1, further comprising a sensor configured to detect the presence of the user, wherein the control circuit is configured to receive the indication of the user's presence from the sensor.

7. The load regulation device of claim 6, wherein the control circuit is configured to receive the change state instruction from the sensor.

8. The load regulation device of claim 6, wherein the control circuit is configured to receive the change state instruction from an external device.

9. The load regulation device of claim 8, wherein the external device comprises an actuator configured to actuate the electrical load and the change state instruction is received in response to an actuation of the actuator.

10. The load regulation device of claim 1, further comprising a communication circuit configured to receive one or more signals from an external device.

11. The load regulation device of claim 10, wherein the control circuit is configured to receive the indication of the user's presence via the one or more signals received from the external device.

12. The load regulation device of claim 11, wherein the control circuit is configured to receive the change state instruction via the one or more signals received from the external device.

13. The load regulation device of claim 10, wherein the external device comprises a sensor.

14. The load regulation device of claim 10, wherein the one or more signals comprise at least one digital message.

15. The load regulation device of claim 10, wherein the control circuit is configured to receive the change state instruction from a second external device.

16. The load regulation device of claim 15, wherein the second external device comprises an actuator for controlling the electrical load and the change state instruction is received in response to an actuation of the actuator.

17. The load regulation device of claim 1, wherein the electrical load comprises a lighting load or a motorized window treatment.

18. A method for controlling an electrical load, the method comprising:
   operating in a low-power state during which the electrical load is unenergized;
   receiving an indication of a user's presence while operating in the low-power state;
   in response to receiving the indication, starting to prepare for energizing the electrical load while the electrical load remains unenergized; and entering an on state to energize the electrical load if a change state instruction is received within a first predetermined period of time after starting to prepare for energizing the electrical load, or stopping the preparation for energizing the electrical load if the change state instruction is not received within the first predetermined period of time.

19. The method of claim 18, further comprising, while in the on state, returning to the low-powered state in response to receiving an actuation of an actuator or in response to receiving an indication of a lack of the user's presence in a vicinity of the electrical load for a second predetermined period of time.

20. The method of claim 18, wherein starting to prepare for energizing the electrical load comprises one or more of the following: rendering conductive a controllably conductive device, charging a power supply, or initializing a communication channel.

* * * * *